(12) United States Patent
Sakaguchi et al.

(10) Patent No.: US 8,555,106 B2
(45) Date of Patent: *Oct. 8, 2013

(54) DATA MIGRATION MANAGEMENT APPARATUS AND INFORMATION PROCESSING SYSTEM

(75) Inventors: Akihiko Sakaguchi, Tachikawa (JP); Hiroshi Yamakawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,929

(22) Filed: Sep. 13, 2012

(65) Prior Publication Data

US 2013/0007387 A1    Jan. 3, 2013

Related U.S. Application Data

(63) Continuation of application No. 13/476,620, filed on May 21, 2012, now abandoned, which is a continuation of application No. 12/493,978, filed on Jun. 29, 2009, now Pat. No. 8,205,112.

(30) Foreign Application Priority Data

May 13, 2009    (JP) ................................. 2009-116486

(51) Int. Cl.
    *G06F 11/00*    (2006.01)
(52) U.S. Cl.
    USPC .................................................. 714/2; 714/1
(58) Field of Classification Search
    None
    See application file for complete search history.

(56) References Cited

U.S. PATENT DOCUMENTS

| | | | |
|---|---|---|---|
| 5,680,640 A | 10/1997 | Ofek et al. | |
| 7,080,221 B1 | 7/2006 | Todd et al. | |
| 7,165,154 B2 | 1/2007 | Coombs et al. | |
| 7,216,208 B2 * | 5/2007 | Yamamoto et al. | 711/162 |
| 7,475,189 B2 | 1/2009 | Gabryjelski | |
| 7,546,482 B2 | 6/2009 | Blumenau et al. | |
| 7,546,484 B2 | 6/2009 | Sen et al. | |
| 7,568,124 B2 | 7/2009 | Ali et al. | |
| 7,809,905 B2 | 10/2010 | Maruyama et al. | |
| 7,996,640 B2 | 8/2011 | Shibayama et al. | |
| 8,200,928 B2 * | 6/2012 | Arakawa et al. | 711/162 |
| 8,347,053 B2 * | 1/2013 | Arakawa et al. | 711/162 |
| 2006/0107085 A1 | 5/2006 | Daniels et al. | |
| 2006/0212746 A1 | 9/2006 | Amegadzie et al. | |
| 2007/0245110 A1 | 10/2007 | Shibayama et al. | |
| 2008/0184063 A1 | 7/2008 | Abdulvahid | |
| 2008/0288560 A1 | 11/2008 | Kaji et al. | |
| 2009/0106510 A1 | 4/2009 | Fujihara et al. | |
| 2011/0179243 A1 * | 7/2011 | Gardner et al. | 711/162 |

FOREIGN PATENT DOCUMENTS

| | | |
|---|---|---|
| EP | 1 637 997 A2 | 3/2006 |
| EP | 1 909 166 A2 | 4/2008 |
| JP | 2007-286709 | 11/2007 |
| JP | 2008-203937 A | 9/2008 |
| JP | 2008-287327 | 11/2008 |
| JP | 2009-098941 | 5/2009 |

\* cited by examiner

*Primary Examiner* — Yolanda L Wilson
(74) *Attorney, Agent, or Firm* — Foley & Lardner LLP

(57) ABSTRACT

The present invention provides a data migration management apparatus that can easily create a re-execution task for re-executing an error-terminated data migration task, and also can increase the possibility of the re-execution task being successful. In a case where a data migration from a migration-source volume to a migration-destination volume fails, the management apparatus uses the information of the failed task to create a re-execution task. The management apparatus changes the configuration of a volume pair as necessary. The management apparatus manages the failed task in association with the re-execution task.

18 Claims, 23 Drawing Sheets

FIG. 5

TASK MANAGEMENT TABLE (OVERALL TASK) T11

| C110 | C111 | C112 | C113 | C114 | C115 | C116 | C117 | C118 |
|---|---|---|---|---|---|---|---|---|
| TASK ID | TASK STATUS | PROGRESS | START DATE / TIME | END DATE / TIME | ESTIMATED TIME | REQUIRED TIME | ORIGINAL TASK ID | RE-TASK ID |
| TK0001 | COMPLETE | 100% | 2-12 03:30:30 | 2-12 03:45:30 | 20:00:00 | 18:45:00 | — | — |
| TK0002 | ERROR | 70% | 2-12 04:30:30 | 2-12 05:40:30 | 20:00:00 | — | — | TK0020 |
| ... | ... | ... | ... | ... | ... | ... | ... | ... |
| TK0010 | COMPLETE | 100% | 2-12 08:30:30 | 2-12 08:45:30 | 15:00:00 | 15:00:00 | — | — |
| TK0011 | ERROR | 0% | 2-12 09:30:30 | 2-12 09:35:30 | 17:00:00 | — | — | — |
| ... | ... | ... | ... | ... | ... | ... | ... | ... |
| TK0020 | EXECUTING | 30% | 2-12 15:30:30 | 2-12 15:40:30 | 25:00:00 | — | TK0002 | — |

FIG. 6

TASK MANAGEMENT TABLE (TASK UNITS) T12

| C120 | C121 | C122 | C123 | C124 | C125 | C126 | C127 |
|---|---|---|---|---|---|---|---|
| TASK ID | MIGRATION-SOURCE LU-ID | MIGRATION-DESTINATION LU-ID | VOLUME STATUS | PROGRESS | ERROR ID | ESTIMATED TIME | REQUIRED TIME |
| TK0002 | V0001 | V1001 | NORMAL END | 100% | — | 20:00:00 | 18:30:00 |
| | V0002 | V1002 | ERROR | 40% | E0001 | — | — |
| | V0003 | V1003 | ERROR | 10% | E0001 | — | — |
| | V0004 | V1004 | NORMAL END | 100% | — | 18:00:00 | 17:45:00 |
| | V0005 | V1005 | NORMAL END | 100% | — | 15:00:00 | 16:00:00 |

FIG. 7

ERROR INFORMATION TABLE (T20)

| ERROR ID (C20) | ERROR DETAILS (C21) | RETRY FLAG (C22) |
|---|---|---|
| E0001 | TIMEOUT | YES |
| E0002 | IN USE | NO |
| E0003 | NON-MIGRATABLE VOLUME | NO |
| E0004 | COMMUNICATION WITH EXTERNAL STORAGE DEVICE FAILED | NO |
| ... | ... | ... |

FIG. 8

VOLUME INFORMATION TABLE T30

| C30 VOLUME ID | C31 RAID LEVEL | C32 DISK TYPE | C33 REVOLUTIONS | C34 SIZE | C35 ARRAY GROUP ID | C36 APPARATUS ID | C37 CONNECTION PATH (INTERNAL PATH OR EXTERNAL PATH) |
|---|---|---|---|---|---|---|---|
| V0001 | RAID 5 (4D+1P) | SATA | 15,000 | 10GB | 1-1-1 | 01 | 01 |
| V0002 | RAID 0 | FC | 10,000 | 10GB | 1-2-1 | 01 | 01 |
| V0003 | RAID 5 (5D+1P) | FC | 7,200 | 20GB | 2-1-1 | 01 | 01 |
| V0004 | RAID 1 | SSD | — | 20GB | 2-2-1 | 01 | 01 |
| ... | ... | ... | ... | ... | ... | ... | ... |

FIG. 15

| | G101 TASK ID | G102 TASK TYPE | G103 TASK STATUS | G104 PROGRESS | G105 START DATE / TIME | G106 END DATE / TIME | G107 ESTIMATED TIME |
|---|---|---|---|---|---|---|---|
| ☐ | TK0001 | MIGRATION | COMPLETE | 100% | 2-12 03:30:30 | 2-12 03:45:30 | 20:00:00 |
| ☐ | TK0002 | MIGRATION | ERROR | 70% | 2-12 04:30:30 | 2-12 05:40:30 | 20:00:00 |
| ☐ | TK0003 | MIGRATION | COMPLETE | 100% | 2-12 08:30:30 | 2-12 08:45:30 | 15:00:00 |
| ☐ | TK0004 | MIGRATION | ERROR | 0% | 2-12 09:30:30 | 2-12 09:35:30 | 17:00:00 |
| ☐ | TK0005 | MIGRATION | EXECUTING | 30% | 2-12 15:30:30 | 2-12 15:40:30 | 25:00:00 |
| ☐ | TK0006 | MIGRATION | PRE-EXECUTION | — | 2-12 17:30:30 | — | |

G100 · G108 EXECUTE · G109 CANCEL · G110 PAUSE · G111 RE-EXECUTE · G10

DATA MIGRATION MANAGEMENT APPARATUS AND INFORMATION PROCESSING SYSTEM

CROSS-REFERENCE TO RELATED PATENT APPLICATIONS

Japan Priority Application 2009-116486, filed May 13, 2009 including the specification, drawings, claims and abstract, is incorporated herein by reference in its entirety. This application is a Continuation of U.S. application Ser. No. 13/476,620, filed May 21, 2012, incorporated herein by reference in its entirety, which is a Continuation of U.S. application Ser. No. 12/493,978, filed Jun. 29, 2009, incorporated herein by reference in its entirety.

BACKGROUND OF THE INVENTION

1. Field of the Invention

The present invention relates to a data migration management apparatus and an information processing system.

2. Description of the Related Art

The amount of data being handled by companies is increasing every year. For this reason, companies are using a plurality of different storage controllers to construct relatively large-scale information processing systems that manage large volumes of data. Since the frequency with which data is utilized will decrease in accordance with the passage of time, the location where data is stored is reallocated in accordance with the data utilization frequency.

Accordingly, the effective use of the storage resources inside a data processing system is accomplished by storing data that has a relatively high utilization frequency in a faster logical volume, and migrating data that has a relatively low utilization frequency to a slower logical volume. In the prior art, migration-targeted data is reallocated within the information processing system by copying backup data to the migration-destination logical volume.

However, in a method that makes use of backup data, the host computer is prohibited from accessing the migration-targeted data until data reallocation has ended. Therefore, the processing of work on the host computer must stop until data reallocation is over, lowering usability. Accordingly, technology that enables the reallocation of data without suspending host computer access has been proposed (U.S. Pat. No. 5,680,640).

In a case where data is migrated while the host computer is permitted access as in the prior art disclosed in the above-mentioned patent document, host computer access to data and a data copy for migrating this data are generated simultaneously. This increases the I/O (Input/Output) load of the migration-targeted data.

If host computer access frequency is high in this case, the processing load of the storage controller increases, lengthening the time required for a data copy to be completed. Not only that, but when processing is carried out giving priority to host computer access, there is also the possibility of a data copy process ending in error as a result of a timeout error.

When a data migration ends in error, the user managing the information processing system must first specify which data migration, from among the plurality of data migrations that were set, has ended in error, and reset a new data migration.

In a relatively large-scale information processing system being used at a company or the like, a plurality of data may be reallocated at one time at this point. In addition, in a case where a plurality of different data are mutually associated, these mutually associated data must be migrated simultaneously.

In a relatively large-scale information processing system like this, a complicated data migration is planned and executed in the middle of the night when access is relatively scarce. If the planned data migration is not completed due to a partial error, the user must once again devise and reset a complicated data migration plan, lowering usability.

Furthermore, the new data migration plan should be reset in accordance with the reason for the failure of the initial data migration plan, but since the user resets the data migration plan relying on his experience and intuition, there is no guarantee that the new data migration will be completed as planned.

SUMMARY OF THE INVENTION

Accordingly, an object of the present invention is to provide a data migration management apparatus and an information processing system that make it possible to set and execute a data migration relatively easily. Another object of the present invention is to provide a data migration management apparatus and an information processing system that make it possible to estimate the completion time of a data migration based on data migration history information, and to change the data migration execution plans in accordance with the result of this estimation. Yet other objects of the present invention should become clear from the descriptions of the embodiments explained hereinbelow.

To solve for the above-mentioned problems, a data migration management apparatus according to a first aspect of the present invention is for managing a data migration inside an information processing system comprising a plurality of storage areas, and has a memory for storing an execution plan for migrating data from a migration-source storage area, which is included in the storage areas, to a migration-destination storage area, which is included in the storage areas; a microprocessor for creating, managing and executing the execution plan store in the memory; and a communication interface for the microprocessor to communicate via a communication network with a storage controller for controlling the storage areas, and the microprocessor migrates the data from the migration-source storage area to the migration-destination storage area by (1) creating the execution plan and storing the plan in the memory; (2) migrating the data from the migration-source storage area to the migration-destination storage area by issuing an instruction based on the execution plan to the storage controller via the communication network; (3) determining whether the execution plan was completed as planned or failed; (4) using the information included in the execution plan to create a re-execution plan in a case where the execution plan is determined to have failed; (5) storing the re-execution plan in the memory in association with the execution plan; and (6) issuing a separate instruction based on the re-execution plan to the storage controller via the communication network.

In a second aspect according to the first aspect, history information related to a data migration executed inside the information processing system is also stored in the memory, and the microprocessor estimates a migration completion time required to complete either the execution plan or the re-execution plan based on the history information stored in the memory, and outputs the estimated migration completion time in association with either the execution plan or the re-execution plan.

In a third aspect according to the second aspect, an execution result of the execution plan is reflected in the history information, and the microprocessor estimates the migration completion time of the re-execution plan based on the history information in which the execution result of the execution plan has been reflected.

In a fourth aspect according to the first aspect, in a case where the execution plan failed, the microprocessor creates a re-execution plan by changing either the migration-source storage area or the migration-destination storage area, or both, to a different storage area in accordance with the reason for the failure.

In a fifth aspect according to the fourth aspect, a failure reason table, which stipulates beforehand whether or not a retry is possible for the each failure reason, is stored in the memory, and the microprocessor determines whether or not the failure reason for the execution plan is a retryable failure reason by referencing the failure reason table, and in a case where the failure reason for the execution plan is set as being non-retryable, creates a re-execution plan by changing either the migration-source storage area or the migration-destination storage area, or both, to a different storage area.

In a sixth aspect according to the fourth aspect, the microprocessor selects the different storage area from among the storage areas based on an attribute of the storage area to be a change target, of the migration-source storage area and the migration-destination storage area.

In a seventh aspect according to the first aspect, history information related to a data migration executed inside the information processing system is also stored in the memory, and in a case where the execution plan failed, the microprocessor determines whether or not it is possible to re-select the migration-source storage area and the migration-destination storage area included in the execution plan to create a re-execution plan, and when the migration-source storage area and the migration-destination storage area are determined to be re-selectable, the microprocessor estimates, on the basis of the history information, a migration completion time required to complete the data migration from the migration-source storage area to the migration-destination storage area, and when the estimated migration completion time corresponds to a preset prescribed change condition, the microprocessor changes the migration-destination storage area to a different storage area included in the storage areas.

In an eighth aspect according to the seventh aspect, the microprocessor selects, as the different storage area, a storage area having either the same or similar attributes as the migration-destination storage area which is a change target.

In a ninth aspect according to the seventh aspect, the prescribed change condition is either one or a plurality of: a case where the migration completion time estimated this time is a first prescribed value or longer than a previously estimated migration completion time for the execution plan that failed; a case where the time required from the start to failure of the execution plan is a second prescribed value or longer than the previously estimated migration completion time for the execution plan; and a case where, when a plurality of data migration pairs configured from the migration-source storage area and the migration-destination storage area are included in the execution plan, the migration completion time estimated for either one of the data migration pairs is a third prescribed value or longer than the migration completion time estimated for the other data migration pairs.

In a tenth aspect according to the first aspect, a plurality of data migration pairs configured from the migration-source storage area and the migration-destination storage area are included in the execution plan, and the microprocessor determines that the execution plan failed in a case where a data migration has failed for either one of the data migration pairs included in the execution plan, and the microprocessor uses information that is used in setting the data migration pair for which data migration failed of the respective data migration pairs included in the execution plan that failed, to create a re-execution plan for completing the data migration for the data migration pair for which data migration failed.

In an eleventh aspect according to the first aspect, an execution plan management table for storing the execution plan and the re-execution plan created by the microprocessor is also stored in the memory, and an identifier for identifying the execution plan and an identifier for identifying the re-execution plan are set in the execution plan management table so as to differ from one another.

In a twelfth aspect according to the first aspect, in a case where the re-execution plan has been associated with the execution plan that failed, the microprocessor prohibits the creation of another execution plan related to the execution plan.

An information processing system according to a thirteenth aspect is an information processing system comprising a data migration management apparatus for managing a data migration; and a plurality of storage controllers, which are connected to the data migration management apparatus via a communication network, and which each has a plurality of storage areas, wherein the data migration management apparatus has: a memory for storing an execution plan for migrating data from a migration-source storage area, which is included in the storage areas, to a migration-destination storage area, which is included in the storage areas; a microprocessor for creating, managing and executing the execution plan stored in the memory; and a communication interface for the microprocessor to communicate via the communication network with the storage controllers, and the microprocessor migrates the data from the migration-source storage area to the migration-destination storage area by (1) creating the execution plan and storing the plan in the memory; (2) migrating the data from the migration-source storage area to the migration-destination storage area by issuing an instruction based on the execution plan to the storage controllers via the communication network; (3) determining whether the execution plan was completed as planned or failed; (4) using the information included in the execution plan to create a re-execution plan in a case where the execution plan is determined to have failed; (5) storing the re-execution plan in the memory in association with the execution plan; and (6) issuing a separate instruction based on the re-execution plan to the storage controllers via the communication network.

The present invention may also be perceived as a method for managing a data migration as described below. That is, it is a data migration management method for managing a data migration inside an information processing system comprising a plurality of storage areas, the data migration management method comprising the steps of creating an execution plan for migrating data from a migration-source storage area, which is included in the storage areas, to a migration-destination storage area, which is included in the storage areas, and storing same in the memory; migrating the data from the migration-source storage area to the migration-destination storage area by issuing an instruction, which is based on the execution plan, to the storage controller for controlling the storage areas; determining whether the execution plan was completed as planned or failed; creating a re-execution plan using the information included in the execution plan when the execution plan is determined to have failed; storing the re-execution plan in the memory in association with the execution plan; and migrating the data from the migration-source storage area to the migration-destination storage area by issuing to the storage controller a separate instruction based on the re-execution plan.

The functions, means or steps of the present invention may be able to be configured either entirely or in part as a computer program. This computer program may be transferred by being affixed on a recording medium, or it may also be transmitted via the Internet or other such communication network. Furthermore, the characteristic features described above may be combined into combinations other than those described, and such combination are also included within the scope of the present invention.

BRIEF DESCRIPTION OF THE DRAWINGS

FIG. 5 is a schematic diagram showing a portion of a task management table;

FIG. 6 is a schematic diagram showing the other portion of the task management table;

FIG. 7 is a schematic diagram of an error information table;

FIG. 8 is a schematic diagram of a volume information table;

FIG. 15 is a diagram showing an example of a screen for instructing a re-execution;

DESCRIPTION OF THE PREFERRED EMBODIMENTS

Figure 1:
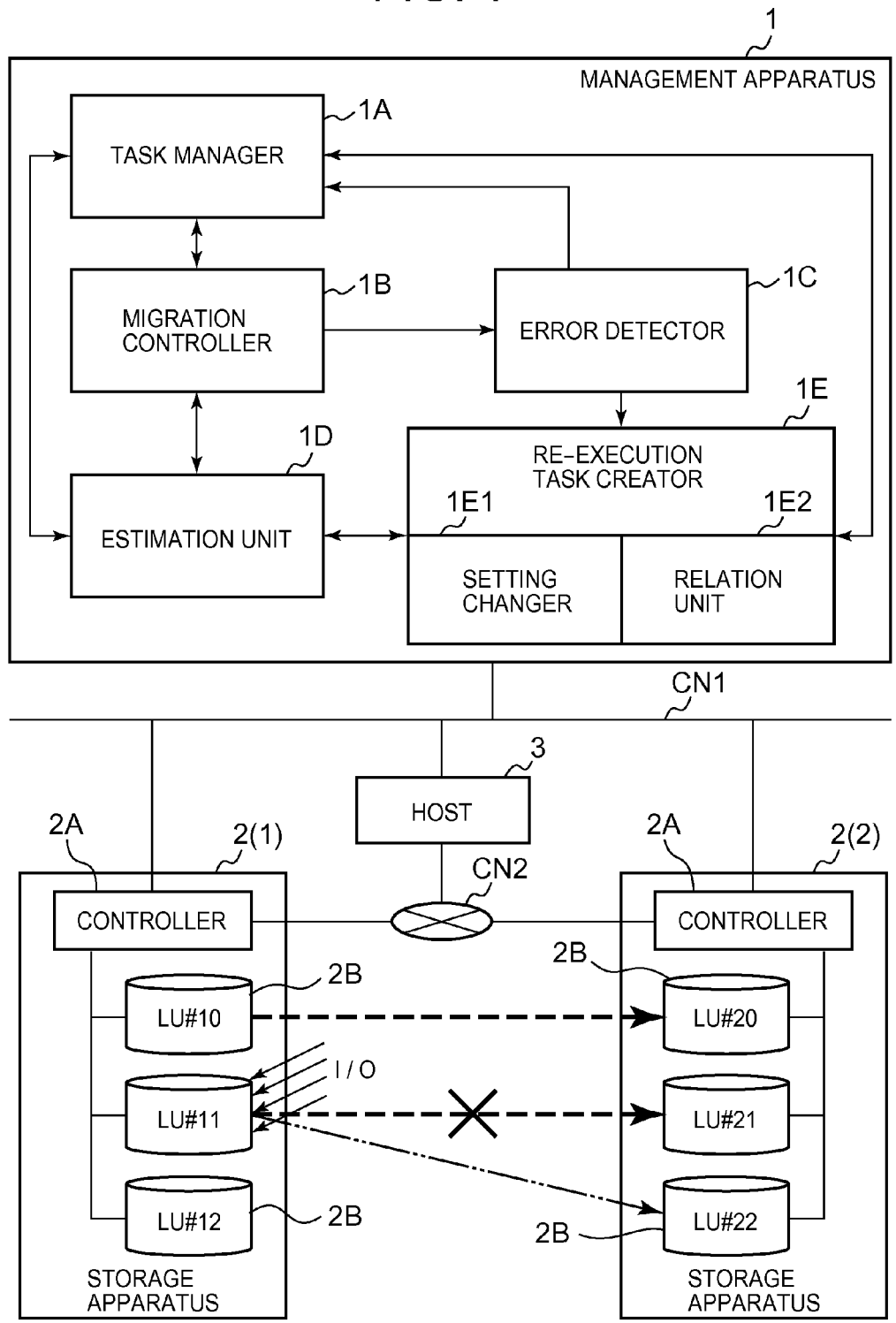
FIG. 1 is a schematic diagram showing a concept of an embodiment of the present invention.

The embodiments of the present invention will be explained hereinbelow while referring to the drawings. In this embodiment, setting information related to a data migration task that ended in error is used to create a new task for re-executing this data migration as described hereinbelow. Furthermore, in this embodiment, the time required to end a data migration is estimated based on data migration history information, and the result of this estimation is provided to the user. In the explanation that follows, "data migration" may be shortened to "migration."

FIG. 1 is a schematic diagram showing an overall concept of this embodiment. The configuration shown in FIG. 1 is an example for aiding in understanding the present invention, but the scope of the present invention is not limited to the configuration shown in FIG. 1. An information processing system, for example, comprises a management apparatus 1; a plurality of storage apparatuses 2(1), 2(2); a host computer 3 (host computer will be shortened to host hereinafter); and communication networks CN1, CN2.

The storage apparatus 2 and host 3 are connected to the management apparatus 1 via a communication network CN1 for management use. In addition, each storage apparatus 2 is connected to the host computer 3 and the other storage apparatus 2 via a communication network CN2 for I/O use.

The management communication network CN1, for example, is configurable as a communication network, like either a LAN (Local Area Network) or the Internet. The I/O communication network CN2, for example, is configurable as a communication network, like either a IP-SAN (Internet Protocol-Storage Area Network) or a FC-SAN (Fibre Channel-SAN). Furthermore, the configuration may also be such that I/O data transfer and management communications are carried out via a single communication network instead of using two communication networks CN1, CN2.

The configurations of the storage apparatuses 2(1), 2(2) will be explained first before explaining the configuration of the management apparatus 1. The storage apparatuses 2(1), 2(2), which serve as "storage controllers", for example, have controllers 2A and logical volumes 2B.

The respective storage apparatuses 2(1), 2(2) may relate to one another equally, or the relation may be such that the one storage apparatus 2(1) uses the storage resources (for example, the logical volume) of the other storage apparatus 2(2). The latter relationship is called an "external connection", and in accordance with this, the one storage apparatus 2(1) constitutes the connection-source storage apparatus, and the other storage apparatus 2(2) constitutes the connection-destination storage apparatus. In the following explanation, when there is no particular need to distinguish between the two, the storage apparatuses 2(1), 2(2) will be called the storage apparatuses 2.

The controllers 2A control the configurations and operations of the storage apparatuses 2. The respective logical volumes 2B are logical storage areas created on the basis of physical storage areas having either one or a plurality of storage devices. More specifically, for example, physical storage areas each having a plurality of storage devices are collected into a group, and either one or a plurality of logical volumes 2B may be set on this group of physical storage areas. In FIG. 1, a number such as "#10", "#20" and so forth is added for identifying the respective logical volumes 2B.

As a storage device, for example, various devices capable of reading and writing data, such as a hard disk device, a semiconductor memory device, an optical disk device, a magneto-optical disk device, a magnetic tape device, and a flexible disk device, may be used here.

In a case when a hard disk device is utilized as a storage device, for example, it is possible to use a FC (Fibre Channel) disk, SCSI (Small Computer System Interface) disk, SATA disk, ATA (AT Attachment) disk, SAS (Serial Attached SCSI) disk or the like. It is also possible to use a variety of storage devices, such as, for example, a flash memory, FeRAM (Ferroelectric Random Access Memory), MRAM (Magnetoresistive Random Access Memory), Ovonic Unified Memory, and RRAM (Resistance RAM). In addition, the configuration may also be such that different types of storage devices, such as a flash memory and a hard disk drive, are used integratively.

The host 3 is also connected to each of the storage apparatuses 2 via the communication network CN2, and reads and writes data by accessing the logical volumes 2B of the respective storage apparatuses 2. The host 3, for example, is equipped with application programs, such as customer management software and sales management software, and provides services to a client computer (not shown in the drawing) connected to the host 3.

The management apparatus 1, for example, comprises a task manager 1A; a migration controller 1B; an error detector 1C; an estimator 1D; and a re-execution task creator 1E. These functions 1A through 1E are realized in accordance with prescribed programs installed in the management apparatus 1. At least a portion of the respective functions 1A through 1E may be configured as a hardware circuit.

The task manager 1A is a function for managing a migration task for re-allocating data. A task for carrying out a migration is inputted, either manually or automatically, into the task manager 1A. The task manager 1A manages and stores the progress, scheduled execution date/time, completion date/time and so forth of each registered task. The task manager 1A also stores the history information related to a data migration task executed in the past.

The migration controller 1B is a function for controlling the execution of a migration task being managed by the task manager 1A. A case where data is migrated from the one storage apparatus 2(1) to the other storage apparatus 2(2) will be given as an example and explained here. The migration controller 1B issues an instruction to the migration-source storage apparatus 2(1) and/or the migration-destination storage apparatus 2(2) on the basis of the migration task, and executes a data migration. The configuration may be such that a data migration execution start instruction is only issued to either one of the migration-source storage apparatus 2(1) or the migration-destination storage apparatus 2(2). The configuration may also be such that either an array group identifier or a storage device identifier is used instead of specifying the migration-destination volume.

As is described in the embodiments explained hereinbelow, it is possible to dispose a plurality of volume pairs inside a single migration task. In other words, it is possible to manage and simultaneously migrate a plurality of associated data as a single group. This kind of group is called a migration group.

The error detector 1C is a function for detecting an error related to the data migration process. The error detector 1C, for example, detects the occurrence of an error, such as a "timeout", "communication failure" or "unusable". The contents of the respective errors will be revealed in the embodiments explained further below. In a case where a single migration task comprises a plurality of data migrations, the error detector 1C detects the presence or absence of an error for each data migration. When all the data migrations in a migration task end normally, it is determined that this migration task ended normally. In a case where any one of the data migrations in the migration task failed, it is determined that this migration task also ended in error.

The re-execution task creator 1E is a function that creates a new task for re-executing a data migration that ended in error with respect to a migration task that was not completed due to error. The re-execution task creator 1E creates a re-execution task using setup information (for example, the migration-source storage apparatus identifier, the migration-source volume identifier, the migration-destination storage apparatus identifier, and the migration-destination volume identifier) related to the data migration that ended in error.

The re-execution task creator 1E, for example, may have a setting changer 1E1 and an association unit 1E2. The setting changer 1E1 changes the configuration with respect to a data migration based on a data migration error. For example, the setting changer 1E1 selects a different logical volume 2B having the same or similar attributes as the migration-destination volume initially selected as a new migration-destination volume. Consequently, the error that occurred in the initial migration task is avoided, and the possibility of a successful data migration is increased. The association unit 1E2 associates the initially created migration task that ended in error with a newly created re-execution task. Consequently, it is possible to easily discern how much of the initially devised data migration plan was ultimately completed.

As will be described in the embodiments explained further below, the re-execution task creator 1E prohibits the creation of a task for a re-execution task-including data migration of the data migrations that ended in error. That is, it prohibits a plurality of re-execution tasks from being created for a data migration that ended in error.

The estimator 1D estimates the time required for completing a data migration. The estimator 1D, for example, is able to estimate the time required for the completion of a data migration prior to executing this data migration based on past history information being managed by the task manager 1A.

For example, the estimator 1D is able to estimate a data migration completion time by comparing the respective parameters (parameters such as data size, data transfer rates of migration-source storage device and migration-destination storage device, and communication line speed) of the data migration to be executed from here on out against history information having either the same or similar parameters.

In a case where a plurality of data migrations are included within the migration task, for example, the completion time for this migration task may be estimated in accordance with the time of the data migration that will be completed the slowest of these data migrations. The above is a case of parallel processing. By contrast, in a case where one data migration ends before the next data migration is executed, the total value of the times required to complete the respective data migrations included in the one migration task may be utilized as the completion time of this migration task.

The result of the data migration completion time estimate is made correspondent to this data migration, and is managed by the task manager 1A. In addition, this estimation result is also provided to the user via a management screen like that described below using FIG. 15.

A data migration process of this information processing system will be explained. In the example of FIG. 1, a plurality of logical volumes 2B (#10), 2B (#11) store mutually associated data, and thus belong to the same migration group.

The user devises a migration plan for this migration group, and registers this plan in the task manager 1A of the management apparatus 1. In this migration plan, one migration-source volume 2B (#10) is migrated to a migration-destination volume 2B (#20) inside the storage apparatus 2(2), and the other one migration-source volume 2B (#11) is migrated to the other migration-destination volume 2B (#21) inside the storage apparatus 2(2). Furthermore, the migration-destination storage area is not limited to a logical volume 2B, and either an array group (may also be called either a RAID group or a parity group) of a storage device may be specified instead.

When the specified time period arrives, the migration controller 1B issues instructions to the respective storage apparatuses 2(1), 2(2) based on the registered migration task, and migrates data between the respective storage apparatuses 2(1), 2(2). The data migration, for example, is realized as a data copy between the logical volumes 2B.

Host 3 access is permitted during the data copy as well. It is supposed that the data copy from the migration-source volume 2B (#10) to the migration-destination volume 2B (#20) was completed normally. However, it is supposed that the data copy from the other migration-source volume 2B (#11) to the other migration-destination volume 2B (#21) has failed.

If the host 3 frequently accesses the migration-source volume 2B (#11) during the data copy, the load on the storage apparatus 2(1) with respect to the migration-source volume 2B (#11) suddenly increases. For this reason, many computer resources of the storage apparatus 2(1) are used for processing the commands from the host 3, generating a timeout during the data copy process. As a result of this, the data migration from the migration-source volume 2B (#11) to the migration-destination volume 2B (#21) ends in an error. The error detector 1C detects this error.

The re-execution task creator 1E reuses the information related to the data migration that ended in error, and creates a new migration task (a re-execution task) for re-executing this data migration that ended in error. Therefore, the user is able to easily create a re-execution task without having to reset all the information required to re-execute the data migration.

Furthermore, the re-execution task creator 1E has the task manager 1A manage the re-execution task by associating the initial migration task with the re-execution task. Therefore, the user is able to easily discern how the initially devised data migration plan was ultimately implemented.

In accordance with configuring this embodiment like this, even in a case where a data migration fails, it is possible to easily create a task for re-executing this data migration, enhancing user usability. In addition, the failed migration task is managed in association with the re-executed migration task making it possible to track where the respective data has been allocated and enabling the user to easily discern the ultimate result of the data migration execution, thereby enhancing usability. This embodiment will be explained in detail below.

First Embodiment

Figure 2:
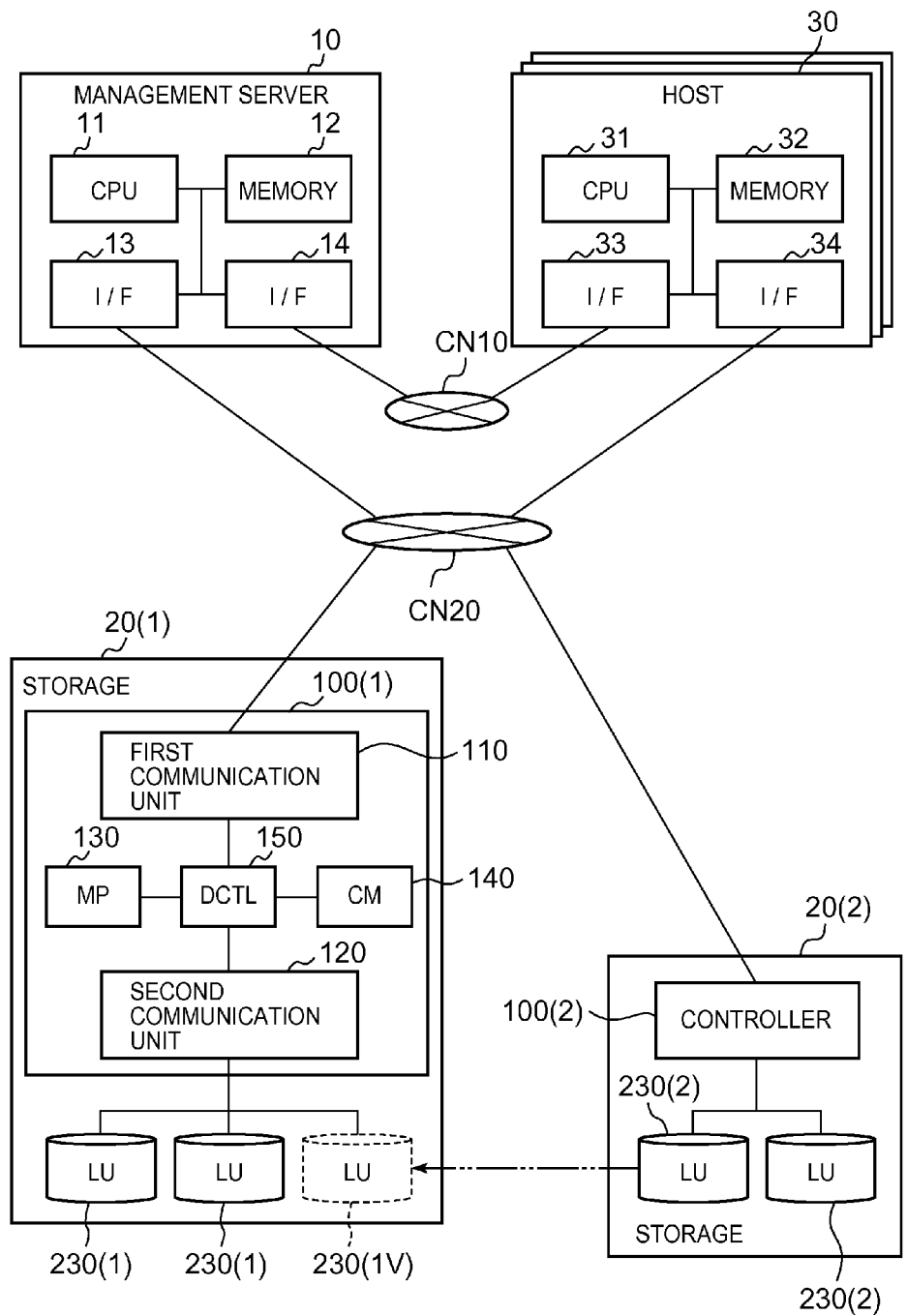
FIG. 2 is a block diagram showing the overall configuration of a system.

The first embodiment will be explained based on FIGS. 2 through 19. FIG. 2 is a schematic diagram showing the configuration of an overall system. The relationship to the configuration shown in FIG. 1 will be described first. The management server 10 corresponds to the management apparatus 1, the storage apparatuses 20(1), 20(2) correspond to the storage apparatuses 2(1), 2(2), the host 30 corresponds to the host 3, the controllers 100 correspond to the controllers 2A, and the logical volumes 230 corresponds to the logical volumes 2B.

In this embodiment, the management server 10, for example, is connected to respective hosts 30 via a communication network CN10 such as a LAN. In addition, the management server 10 is connected to the respective storage apparatuses 20 via a communication network CN20 such as a SAN. Furthermore, the configurations of the communication networks are not limited to those shown in FIG. 2.

The management server 10 is for managing the configuration and operation of the system. The management server 10 manages a data migration inside an information processing system. The management server 10, for example, comprises a microprocessor 11; a memory 12; and communication network interfaces 13, 14. The microprocessor 11 realizes a data migration management function, which will be described further below, by reading in and executing a program stored in the memory 12.

The user, for example, is able to access the management server 10 using either a personal computer or a handheld terminal equipped with a web browser, and may either set a data migration plan or confirm the results of data migration execution.

The management server 10, for example, may also have a display device; and an input device such as a keyboard switch and a pointing device. In accordance with this, the user may use these input/output devices to input information to the management server 10, or to have the management server 10 output information. Or, as described hereinabove, the configuration may be such that a computer for operation and display use, such as a personal computer or handheld terminal, is connected to the management server 10, and either a setting is carried out with respect to the data migration or the results of data migration execution are displayed via the operation and display computer.

Hereinafter, a cluster of one or more computers, which manage the information processing system, set information with respect to a data migration, and display information related to the data migration may be called a management system. In a case where a management computer (for example, the management server 10) comprises the above-mentioned input/output devices and displays information related to the data migration, the management computer is the management system. A configuration that combines the management computer with the computer for operation and display use is also the management system. Furthermore, the configuration may also be such that management is performed using a plurality of computers for increasing the speed and/or reliability of the management process. In this case, the cluster of this plurality of computers constitutes the management system.

The respective storage apparatuses 20(1), 20(2) basically may be formed as apparatuses having substantially the same configuration. When there is no particular need to distinguish between the storage apparatuses 20(1), 20(2), they will be called storage apparatuses 20.

This configuration will be explained by giving storage apparatus 20(1) as an example. Storage apparatus 20(1), for example, comprises a controller 100(1); and a plurality of logical volumes 230(1).

The controller 100(1) controls the operation of the storage apparatus 20(1). For example, the controller 100(1) either writes data to a targeted logical volume 230(1) or reads data from the targeted logical volume 230(1) in accordance with a command issued from the host 30. In addition, the controller 100(1) implements various types of processing (for example, logical volume creation, a data copy between logical volumes, and so forth) for a data migration in accordance with an instruction from the management server 10.

The controller 100(1), for example, comprises a first communication unit 110; a second communication unit 120; a microprocessor 130; a cache memory 140; and a data transfer control circuit 150.

The first communication unit 110 is a control circuit for controlling communications between the host 30 and the other storage apparatus 20(2). The first communication unit 110, for example, is connected to the host 30 and the other storage apparatus 20(2) via a communication network CN20 like an IP-SAN or a FC-SAN.

For example, the initiator port of each host 30 is connected to a plurality of target ports of the first communication unit 110, and the target port of the other controller 100(2) of the other storage apparatus 20(2) is connected to the initiator port of the first communication unit 110.

The second communication unit 120 is a control circuit for carrying out communications with the respective storage devices 210 (Refer to FIG. 3) that configure the respective logical volumes 230(1). The second communication unit 120 is connected to the respective storage devices 210 via a plurality of communication paths. Therefore, even if one communication path fails, it is possible to access the storage device 210 via the other communication path.

The microprocessor (MP in the drawing) 130 is a control circuit for controlling the operation of the controller 100(1). The microprocessor 130 issues a prescribed instruction based on a command received from either the host 30 or the management server 10.

The cache memory (CM in the drawing) 140 is for storing write data and the like. The area of a portion of the cache memory 140 is used as the cache area, and write data is stored therein. The other area of the cache memory 140 is used as the control information area, and control information and management information are stored therein.

The data transfer control circuit 150 is for interconnecting the respective communication units 110, 120, the microprocessor 130, and the cache memory 140. The other storage apparatus 20(2) also comprises a controller 100(2) and logical volumes 230(2) the same as the one storage apparatus 20(1).

In this embodiment, the one storage apparatus 20(1) is able to incorporate and use inside the one storage apparatus 20(1) a logical volume 230(2) of the other storage apparatus 20(2). This technology is called an external connection in this specification. In FIG. 2, two storage apparatuses 20(1), 20(2) are shown for the sake of expediting the explanation, but the scope of the present invention is not limited to this, and the external connection technology may also be utilized for three or more storage apparatuses.

Of the respective logical volumes 230(1) of the one storage apparatus 20(1), the logical volume 230(1V), to which a "V" has been appended, is a virtual logical volume that has been formed using the logical volume 230(2) inside the other storage apparatus 20(2). The logical volume 230(1V), in which a real entity is not provided like this, will be called either an external connection volume or a virtual volume.

The host 30 is able to access the external connection volume 230(1V), but the logical volume in which the data is actually stored is the real volume 230(2) inside the other storage apparatus 20(2).

Accordingly, the one storage apparatus 20(1) converts a write command and a read command for the external connection volume 230(1V) to a command addressed to the connection-destination volume 230(2), and sends this converted command to the other storage apparatus 20(2).

By utilizing the external connection technology like this, the one storage apparatus 20(1) is able to incorporate and use inside the one storage apparatus 20(1) the logical volume 230(2) from inside the other storage apparatus 20(2). In addition, using the functions of the one storage apparatus 20(1), it is possible to provide data to the host 30 from inside the other storage apparatus 20(2), making it possible to enhance the reliability and response performance of the entire system.

The respective hosts 30 provide various services to client computers not shown in the drawing by using the logical volumes 230 inside the storage apparatuses 20. The hosts 30 are connected to the client computers via the Internet or other such communication network (not shown in the drawing). Each host 30, for example, comprises a microprocessor 31; a memory 32; and communication network interfaces 33, 34. The microprocessor 31 provides the client computer with services such as customer management, sales management, and video delivery, for example, by reading in and executing a program stored in the memory 32.

Figure 3:
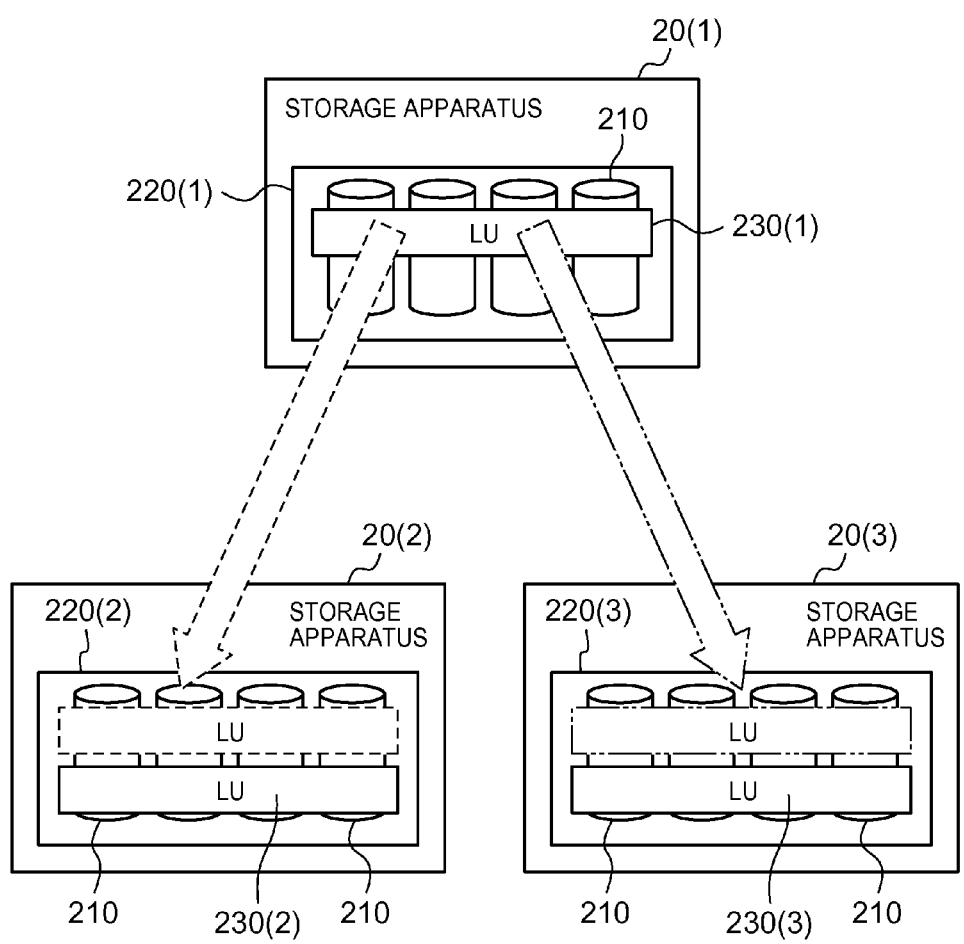
FIG. 3 is a diagram schematically showing a data migration.

FIG. 3 is a schematic diagram showing an overview of a data migration. In FIG. 3, three storage apparatuses 20(1), 20(2), 20(3) are shown. The scope of the present invention is not limited to this, and the present invention may also be applied to a case where a data migration is executed inside a single storage apparatus 20, and is also applicable in a case where a data migration is executed inside a system comprising four or more storage apparatuses.

As shown in the upper portion of FIG. 3, physical storage areas, which have a plurality of storage devices 210 disposed in the storage apparatus 20(1), are collected together into a single array group 220(1), and a logical volume 230(1) is disposed in the storage area of this array group 220(1). Similarly, array groups 220(2), 220(3) and logical volumes 230(2), 230(3) are also disposed in the other storage apparatuses 20(2), 20(3).

A case in which the logical volume 230(1) inside the storage apparatus 20(1) is the migration target will be explained. The migration destination candidates include array group 220(2) and array group 220(3).

The user is able to set a data migration by selecting either of the array groups 220(2), 220(3). Or, it is also possible for the user to set a data migration by selecting the logical volume 230(2), 230(3) belonging to either of the array groups 220(2), 220(3). In addition, the user may also set a data migration by selecting a storage device 210 belonging to either of the array groups 220(2), 220(3).

Figure 4:
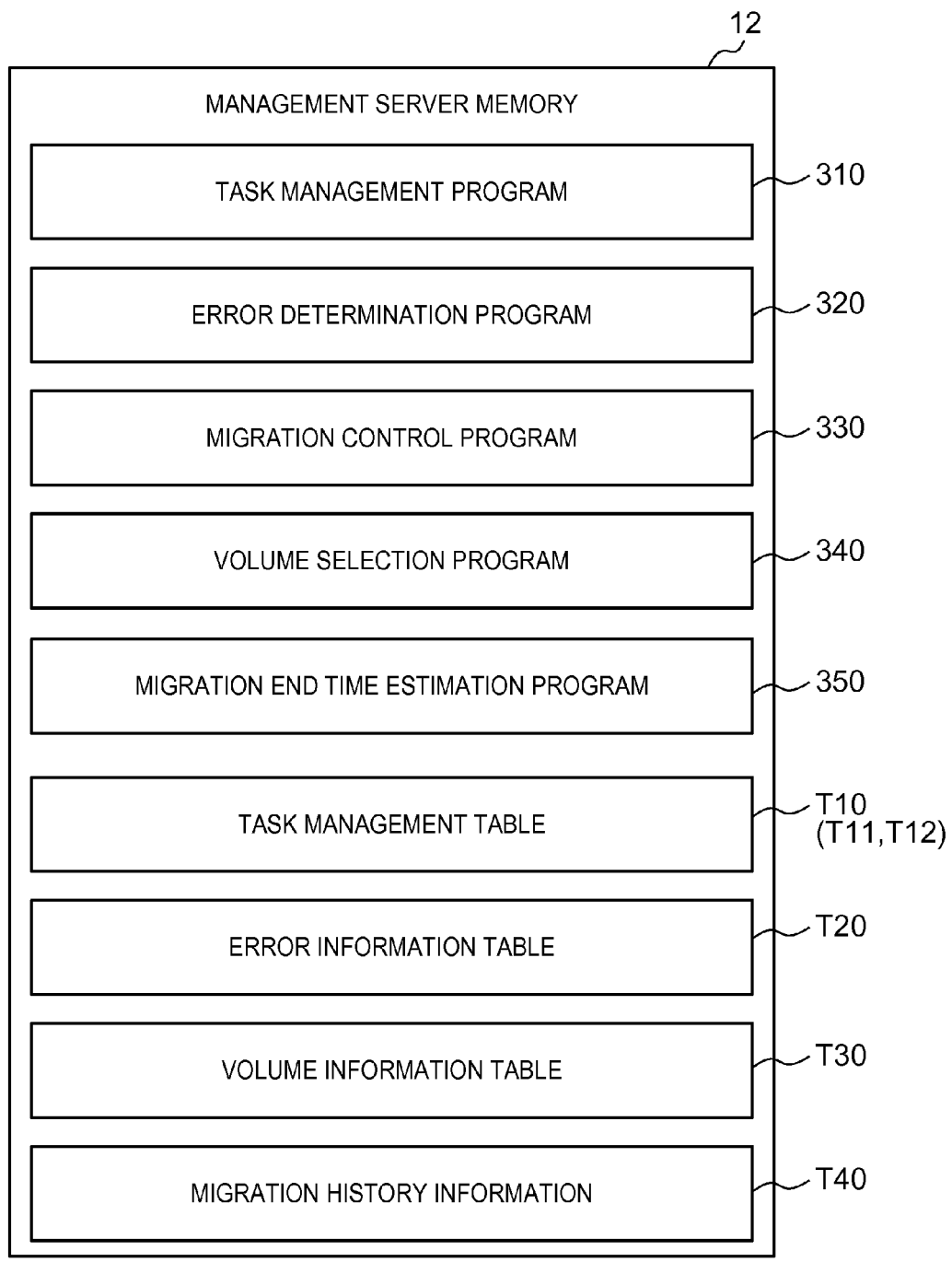
FIG. 4 is a schematic diagram showing the configuration of a memory of a management server.

FIG. 4 is a diagram schematically showing the storage contents of the memory 12 of the management server 10. A plurality of programs 310 through 350 and a plurality of tables T10 through T40 are stored in the memory 12.

As the programs, for example, a task management program 310, an error determination program 320, a migration control program 330, a volume selection program 340, and a migration end time estimation program 350 (hereinafter called the estimation program 350) are stored in the memory 12. Furthermore, the respective programs 310 through 350 may be installed by being sent to the management server 10 from a program delivery server (not shown in the drawing), or the respective programs 310 through 350 may be recorded on recording media and installed by being read into the management server 10 from the recording media.

The task management program 310 is a program that manages the task for executing a data migration. The error determination program 320 is a program that determines whether or not an error has occurred during a data migration process. The migration control program 330 is a program that issues a prescribed instruction to the respective storage apparatuses 20 involved in a data migration and executes the data migration. The volume selection program 340 is a program that selects the appropriate logical volume when creating a task for re-executing a data migration that ended in an error. The estimation program 350 is a program that estimates the time required for the completion of a data migration.

As the tables, for example, a task management table T10, an error information table T20, a volume information table T30 and migration history information T40 are stored in the memory 12.

Furthermore, in the explanation that follows, the various information used in the system of this embodiment will be explained using expressions such as "table" or "database". However, names such as "table" and so forth are only used for the sake of convenience, and the various information used in this system may also be expressed using other data structures besides table and database. In other words, the various information used in this embodiment is not dependent on a data structure.

Therefore, for example, the task management table T10 shown in FIG. 4 may also be called the task management database, or the task management list, or task management information. The same holds true for the other tables T20, T30 as well. Similarly, for example, the migration history information T40 may also be called the migration history management table, the migration history management list or the migration history management database. Examples of the configurations of each table T10 through T40 will be explained below.

FIG. 5 shows a table T11, which configures a portion of the task management table T10, and is for managing an overall task. The task management table T10 has a table T11 used to manage a migration task in its entirety, and a table T12 (refer to FIG. 6) for managing each data migration of a task. The respective management tables T11, T12 are associated with each other via a task ID. A plurality of data migrations may be registered in a single task. The management table T11 shown in FIG. 5 manages the overall task, which includes either one or a plurality of data migrations. The management table T12 shown in FIG. 6 manages each data migration included inside a single task.

Table T11, which manages a migration task in its entirety, for example, comprises a task ID column C110; a task status column C111; a progress column C112; a start date/time column C113; an end date/time column C114; an estimated time column C115; a required time column C116; an original task ID column C117; and a re-task ID column C118. What by rights should have been called the "re-execution task ID" has been shortened to "re-task ID" due to lack of space.

The task ID column C110 manages an identifier (ID) for identifying each migration task. The task status column C111 manages the status of each migration task. The task status, for example, may include "complete", "error", "executing" and "pre-execution (or waiting)". "Complete" denotes a state in which the data migration was completed normally. "Error" denotes a state in which an error has occurred in either a portion or all of the data migrations included in a task. "Executing" denotes a state in which a data migration is in the process of being executed. "Pre-execution (or waiting)" denotes a state of waiting for the data migration execution period to arrive.

The progress column C112 manages the state of progress of a migration task. The state of progress, for example, expresses in percentage form the proportion of the size of the data migration that has actually been completed with respect to the estimated size of the data migration.

The start date/time column C113 manages the date and time at which a data migration is started. The date/time, for example, may be expressed in the form of a Gregorian Calendar year, month, day, hour, minute and second. In the case of a data migration that is in the pre-execution state, the date/time stored in the start date/time column C113 is the scheduled start date/time. When this data migration is executed, the date/time stored in the start date/time column C113 becomes the date/time at which execution was started.

The end date/time column C114 manages the date/time at which a data migration ended. Either the date/time at which the data migration ended normally, or the date/time at which the data migration ended in error is stored in the end date/time column C114. The end date/time column C114 is blank for a data migration that has yet to be executed.

The estimated time column C115 manages the estimated time required to complete a data migration. The estimated completion time remains in the estimated time column C115 whether the data migration ends normally or abnormally.

The required time column C116 manages the time actually required for a data migration. In a case where the data migration ends in an error, the required time column C116 remains blank since the data migration was not completed.

The original task ID column C117 manages the ID of the task on which a re-execution task was created. The re-task ID column C118 manages the ID for identifying the re-execution task. In the case of a task that ended normally, the original task ID column C117 and the re-task ID column C118 remain blank. In the case of a task that has ended in an error, the ID of the failed task is stored in the original task ID column C117 of the re-execution task when the re-execution task is created for this failed task. The ID of the re-execution task is stored in the re-task ID column C118 of the failed task.

In this way, this embodiment assigns a new ID to a new migration task (a re-execution task) for executing a failed migration task once again, and manages this new ID in association with the ID of the original migration task (the failed original task). Therefore, it is possible to easily discern the relationship between a re-execution task and the original task.

FIG. 6 is a schematic diagram showing a table T12 for managing the data migrations inside respective tasks. This management table T12 is prepared for each task included in the management table T11 shown in FIG. 5.

The management table T12, for example, comprises a task ID column C120, a migration-source volume ID column C121, a migration-destination volume ID column C122, a volume status column C123, a progress column C124, an error ID column C125, an estimated time column C126, and a required time column C127.

The task ID column C120 manages the ID of the migration task. The migration-source volume ID column C121 manages the ID of the logical volume that is the data migration source. The migration-destination volume ID column C122 manages the ID of the logical volume that is the data migration destination.

The volume status column C123 manages the status of the data migration. Any one of "normal end", "error termination", "executing" and "pre-execution (or waiting)" is set in the volume status column C123 as the state of the migration-source volume. The progress column C124 manages the state of progress (the state of progress of the copy) of the respective data migrations.

The error ID column C125 manages an error ID for identifying the cause of an error when a data migration ends in error. The estimated time column C126 manages the estimated time required for a data migration to be completed. The required time column C127 manages the actual time required until a data migration was completed.

FIG. 7 shows an error information table T20. The error information table T20 manages the types of errors capable of occurring during a data migration process. The error information table T20, for example, comprises an error ID column C20, an error details column C21, and a retry flag column C22.

The error ID column C20 manages IDs for identifying respective errors. The error details column C21 manages the details of the respective errors. Error details, for example, may include "timeout", "volume in use", "non-migratable volume", and "communication with external storage apparatus failed".

The "timeout" is an error that occurs when there is no response within a prescribed period of time from either the migration-source volume or the migration-destination volume during a data migration (that is, during a data copy). The "volume in use", for example, is an error that occurs because the host is using the migration-destination volume. The "non-migratable volume", for example, is an error that occurs when a special logical volume like a command device has been selected as the migration-source volume. The "communication with external storage apparatus failed" is an error that occurs when communication with the above-mentioned external connection-destination storage apparatus fails.

The retry flag column C22 manages a flag that denotes whether or not a retry is possible. In a case where the retry flag has been set to "Yes", it is possible to re-execute a data migration during which an error occurred. In a case where the retry flag has been set to "No", it is not possible to execute a data migration during which an error occurred.

For example, when the migration-destination volume is in use, it is not possible to specify this volume and re-execute the data migration, and the retry flag is set to "No". Furthermore, in a case where the migration-source volume is a special logical volume, such as a command device, it is not possible to arbitrarily migrate this special volume. Therefore, the retry flag is set to "No" in this case as well. Also, in a case where a malfunction has occurred on the communication path to the external storage apparatus, it is not possible to carry out a data migration using the external storage apparatus until this malfunction has been eliminated. Accordingly, the retry flag is also set to "No" in this case.

FIG. 8 shows a volume information table T30. The volume information table T30 is for managing the respective logical volumes inside the information processing system. The volume information table T30, for example, comprises a volume ID column C30, a RAID level column C31, a disk type column C32, a revolutions column C33, a size column C34, an array group ID column C35, an apparatus ID column C36, and a connection path column C37.

The volume ID column C30 manages IDs for identifying the respective logical volumes 230. The RAID level column C31, for example, manages the RAID level and the RAID configuration of a logical volume 230, such as "RAID5 (4D+1P)", "RAID1 (D+D)", and "RAID6 (6D+2P)". The RAID level also comprises RAID0.

The disk type column C32 manages the type of storage device 210 that provided the storage area to the logical volume 230. For convenience sake, the storage device is called a "disk", but the scope of the present invention is not limited to a disk shaped recording medium. The disk type, for example, may include a SATA disk, a FC disk, or a SSD (solid state device: flash memory device). The revolutions column C33 manages the number of revolutions of the storage device 210 that provides the storage area to the logical volume 230. Furthermore, in the case of a flash memory, the data transfer rate may be set instead of revolutions.

The size column C34 manages the size of the logical volume 230. The array group ID column C35 manages the ID for identifying the array group 220 to which the logical volume 230 belongs. The apparatus ID column C36 manages the ID for identifying the storage apparatus to which the logical volume 230 belongs.

The connection path column C37 manages information related to the communication path for accessing the logical volume 230. The information related to a communication path for carrying out access, for example, may include WWN (World Wide Name), LUN (Logical Unit Number), iSCSI (internet Small Computer System Interface) name, and IP address. In a case where a plurality of communication paths exist for accessing a single logical volume, the information related to this plurality of communication paths is recorded in C37.

Figure 9:
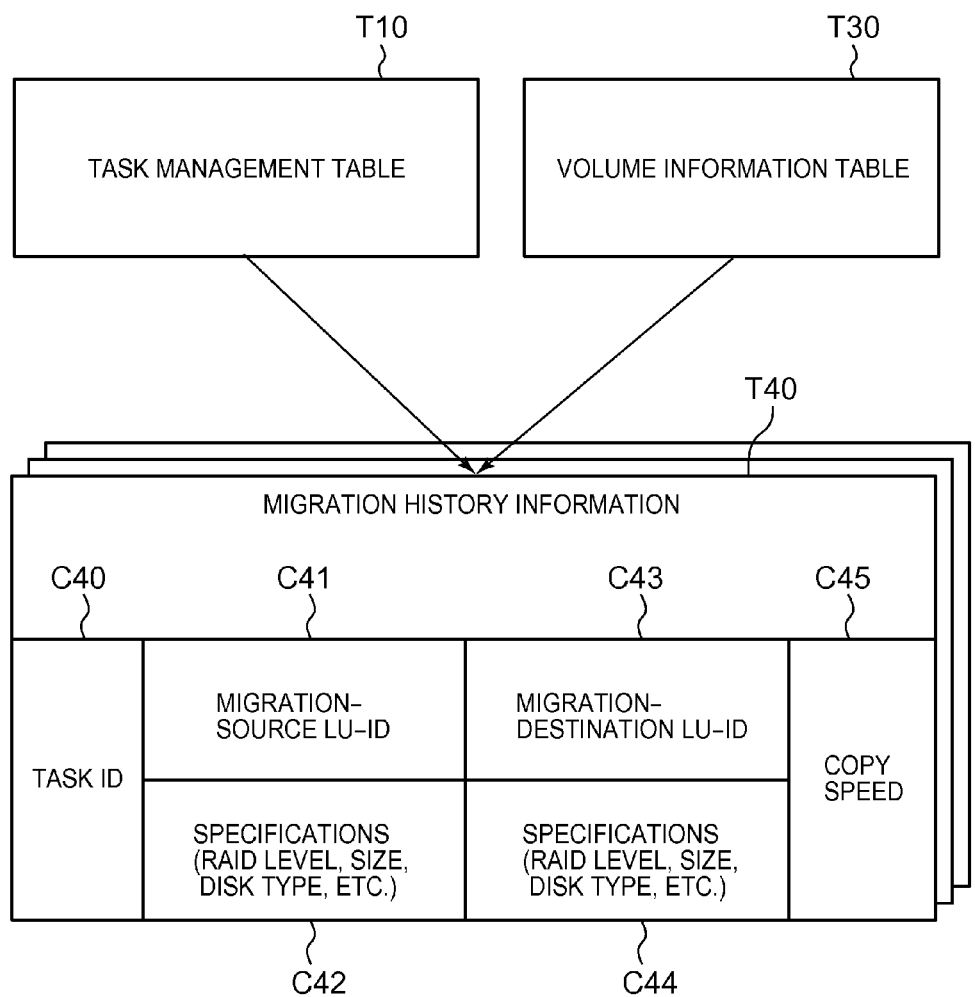
FIG. 9 is a schematic diagram of migration history information.

FIG. 9 shows migration history information T40. The migration history information T40 stores information related to respective data migrations that have been carried out in the past. The migration history information T40, for example, may be created based on information from the task management table T10 (T11, T12) and the volume information table T30.

The migration history information T40, for example, comprises a task ID column C40, a migration-source volume ID column C41, a migration-source volume specifications column C42, a migration-destination volume ID column C43, a migration-destination volume specifications column C44, and a copy speed column C45.

The task ID column C40 manages the ID of a migration task carried out in the past. The migration-source volume ID column C41 manages the ID of the migration-source volume. The migration-source volume specifications column C42 manages information related to the specifications of the migration-source volume. Information related to specifications, for example, may include the RAID level (to include the RAID configuration), the size, the disk type, and the revolutions.

The migration-destination volume ID column C43 manages the ID of the migration-destination volume. The migration-destination volume specifications column C44 manages information related to the specifications of the migration-destination volume. The specifications-related information is the same as that described for the migration-source volume. The copy speed column C45 manages the copying speed of the data migration carried out in the past.

Furthermore, the configuration may also be such that a migration information column C46 is used instead of the copy speed column C45, and the data migration start date/time, the copy speed, and the data migration end date/time are managed inside the migration information column C46.

In addition, the configuration may also be such that the history of respective data migration carried out in the past is managed by the task management table T10. In this case, the migration history information T40 is not necessary.

A data migration process will be explained based on FIGS. 10 through 19. The respective flowcharts shown below denote an overview of the process, and the actual computer programs may differ.

The following explanation will focus mainly on the management server 10 as the operating entity. In actuality, the prescribed process is realized in accordance with the microprocessor 11 inside the management server 10 reading in and executing a computer program that has been stored in the memory 12. Therefore, explanation may also be given using the microprocessor as the operating entity. Furthermore, based on an understanding of the above, the explanation may also be given using the computer program as the operating entity.

Furthermore, either all or a portion of the computer programs may also be configured from dedicated hardware circuits. The computer programs may be installed in the management server 10 by way of a program delivery server for delivering computer programs. Or the computer programs may be stored on recording media and installed by being read into the management server 10 from the recording media.

Figure 10:
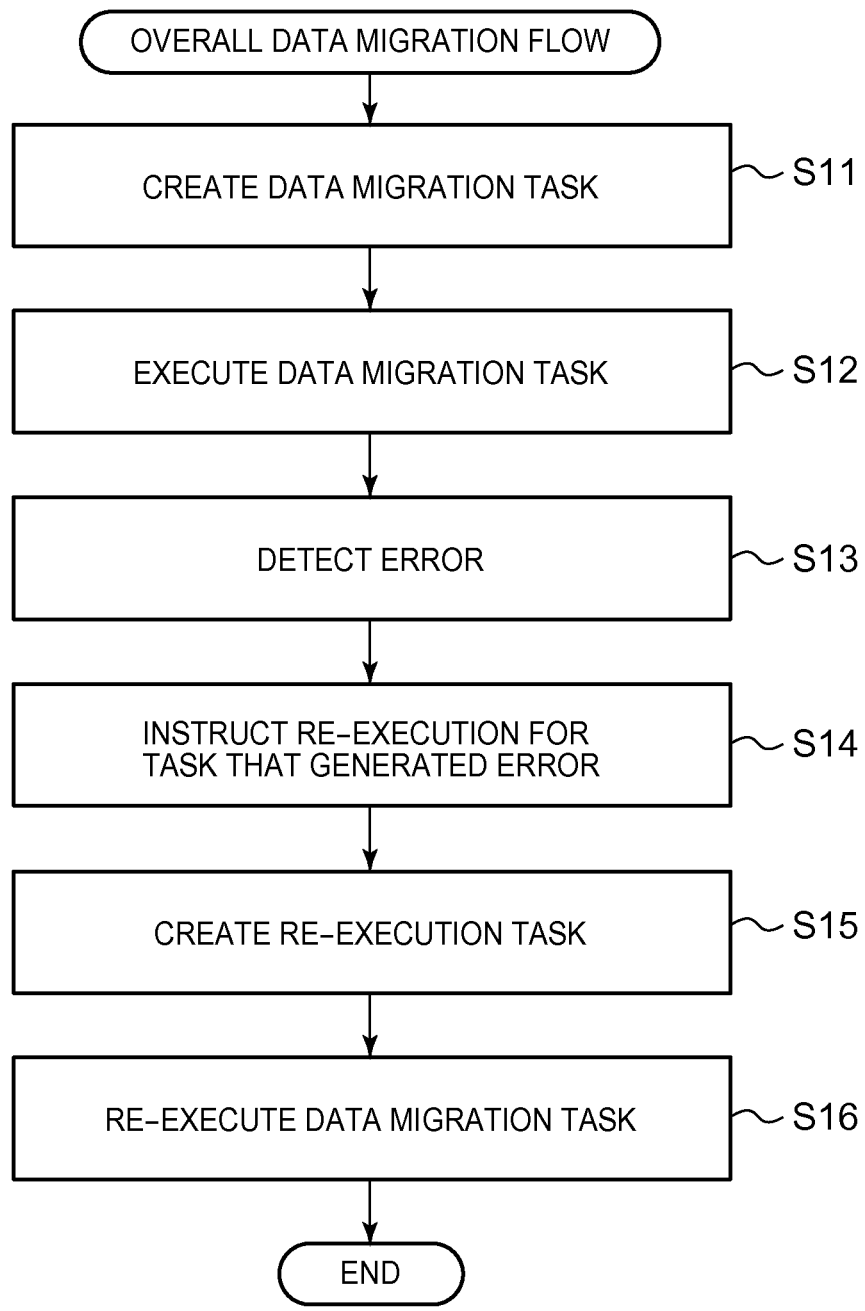
FIG. 10 is a flowchart showing a data migration process in its entirety.

FIG. 10 is a flowchart showing an overview of an entire data migration process. First, the management server 10 creates a task for executing a data migration in accordance with an instruction from the system administrator or other such user (S11).

Instead of a user instruction, the configuration may also be such that a migration task is created based on a prepared migration task creation condition. For example, it is possible to create a migration task in a case where a predetermined condition, such as "migrate data that has not been accessed in a predetermined period of time or longer to a lower cost logical volume" has been met.

The management server 10 compares the scheduled start times of respective migration tasks registered in the task management table T10 against the current time, and when a schedule start time arrives, requests the migration-source storage apparatus and/or the migration-destination storage apparatus to execute a data migration (S12).

This execution request, for example, comprises information for specifying the migration-source volume and information for specifying the migration-destination volume. Furthermore, as described hereinabove, the configuration may also be such that either of a migration-destination array group or a migration-destination storage device is specified instead of specifying the migration-destination volume. In the explanation that follows, a case in which a logical volume is specified as the migration-destination storage device will be explained.

A data migration (that is, a data copy) from the migration-source volume to the migration-destination volume is started based on the execution request from the management server 10 (S12). A response such as that described below is possible in a case where the host 30 accesses the migration-source volume during the data copy. Furthermore, to be precise, writing data to the migration-source volume signifies writing data to the storage device 210 corresponding to the migration-source volume, but for the sake of convenience, will be expressed as "writes data to the migration-source volume". Also, reading data from the migration-source volume actually signifies either reading data from the storage device 210 corresponding to the migration-source volume or reading data from the cache area corresponding to the migration-source volume. However, for convenience sake, this will be expressed as "reads data from the migration-source volume". The same holds true for the reading and writing of data from/to the migration-destination volume.

(1) Permit a read access for reading data from the migration-source volume;

(2) In the case of a write access for updating data inside the migration-source volume, if the write-destination (update-destination) area is a copied area, which has already been copied to the migration-destination volume, write the new data to both the migration-source volume and the migration-destination volume, and return a completed-response to the host 30 after this write has been completed;

(3) Or, in a case that corresponds to a copied area, write the new data to the migration-source volume before returning the write-complete response to the host 30. Thereafter, copy new data from the migration-source volume to the migration-destination volume as a repeatedly executed copy process (called the update copy). In a method like this, it is possible to shorten the time for processing the write request. However, in a case where there is a large amount of write data per unit of time (particularly, a case in which the write request to the migration-source volume is repeated frequently), due to there being limits on the amount of data capable of being processed in an update copy, it may not always be possible to estimate the time until data migration completion.

Furthermore, the method for processing an access from the host 30 during a data migration is not limited to the method described above. However, when there are numerous accesses from the host 30 during a data migration, data migration processing speed decreases, and there is a possibility of ending in an error due to a timeout.

When an error occurs in a data migration process, the management server 10 detects this error (S13). The controller 100 of each storage apparatus 20 monitors the status of each storage device 210, and in a case where a malfunction of some sort has occurred, such as a disk malfunction or a controller malfunction, notifies the management server 10 of the information related to this malfunction.

The malfunction-related information, for example, may comprise an identifier for specifying the storage device 210 and/or the array group 220 in which the malfunction occurred, an identifier for specifying the logical volume 230 in which the malfunction occurred, and a code denoting the type of malfunction.

Furthermore, instead of a configuration in which the occurrence of a malfunction is notified to the management server 10 from the controller 100, the configuration may be such that the management server 10, either regularly or irregularly, queries the controller 100 as to the presence or absence of a malfunction.

The controller 100, upon detecting a malfunction, cancels the data migration process related to this malfunction. The controller 100 notifies the management server 10 to the effect that the data migration process has been cancelled. The configuration may also be such that information denoting that the malfunction was either a disk malfunction or a controller malfunction is sent to the management server 10 from the controller 100 at the time of this notification.

As described hereinabove, when an error is detected during the data migration process, this data migration process is cancelled. The user, based on a screen provided from the management server 10 (refer to FIG. 15), is able to request the creation of a task for re-executing the migration task that ended in error (S14).

The management server 10 creates a re-execution task based on the request from the user, and registers this re-execution task in the task management table T10 (S15). Furthermore, instead of a configuration that creates a re-execution task in accordance with a user instruction, the configuration may be such that the re-execution task is created when a preset condition has been met.

The management server 10, upon the arrival of the start date/time that has been set for the re-execution task, requests that the migration-source storage apparatus and/or the migration-destination storage apparatus execute the data migration process (S16). Each process will be explained in more detail below by referring to the drawings.

Figure 11:
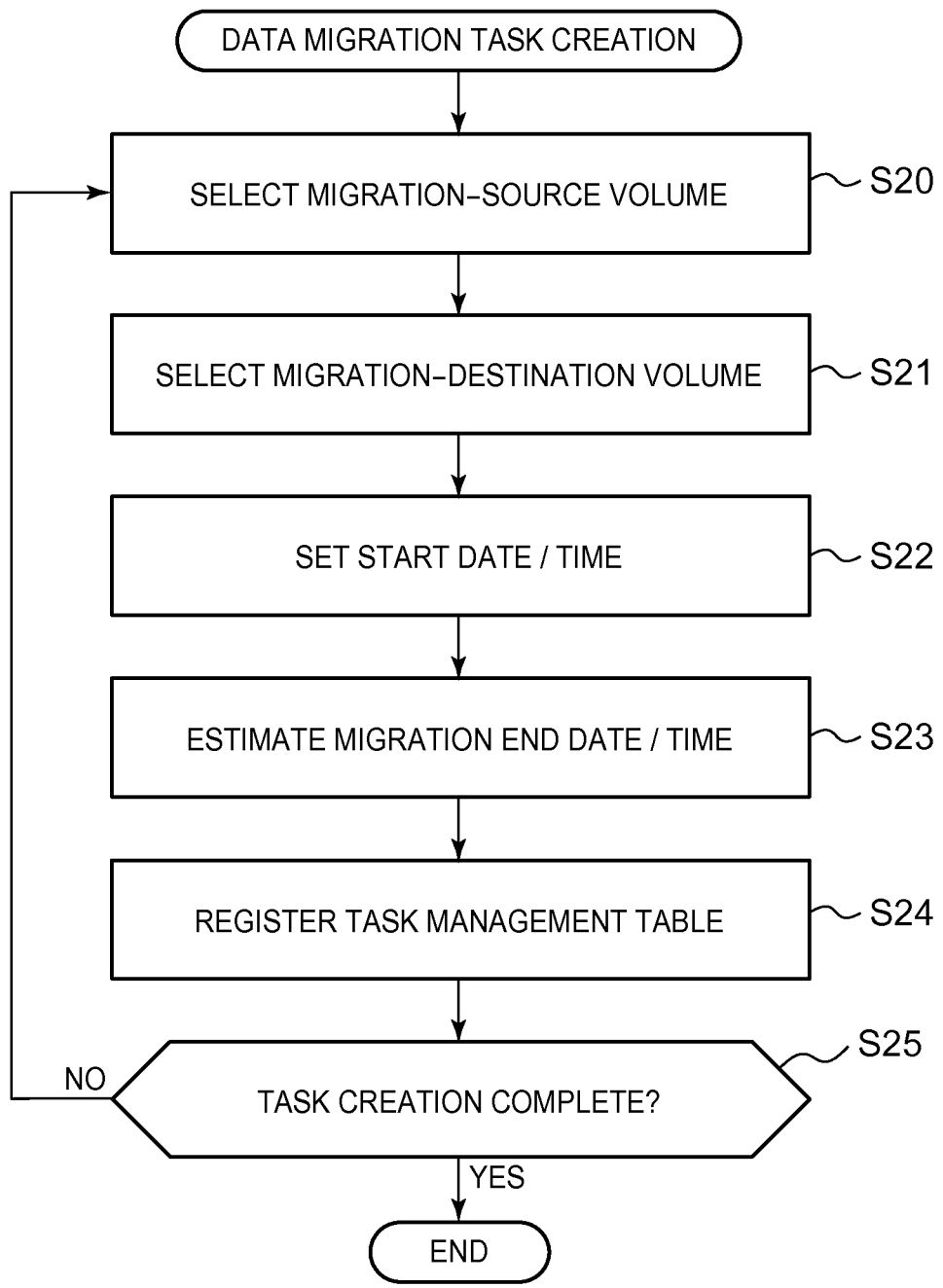
FIG. 11 is a flowchart of a process for creating a data migration task.

FIG. 11 is a flowchart showing the process for creating a data migration task. This process corresponds to S11 of FIG. 10.

The management server 10, for example, respectively selects the migration-source volume and the migration-destination volume based on the instruction from the user (S20, S21), and also sets the data migration start date/time (S22). The configuration may also be such that the selection of the migration-source volume and the migration-destination volume, and the setting of the start date/time are carried out either automatically or semi-automatically.

The management server 10 estimates the time required for the completion of the data migration set in S20 through S22 (S23). The process for estimating the data migration completion time will be described further below using FIG. 17.

The management server 10 registers the data migration set in S20 through S22 and the completion time estimated in S23 in the task management table T10 (S24). The management server 10 repeats S20 through S24 until it determines that the creation of the migration tasks has been completed (S25). When the creation of the migration task has been completed (S25: YES), this process ends.

Figure 12:
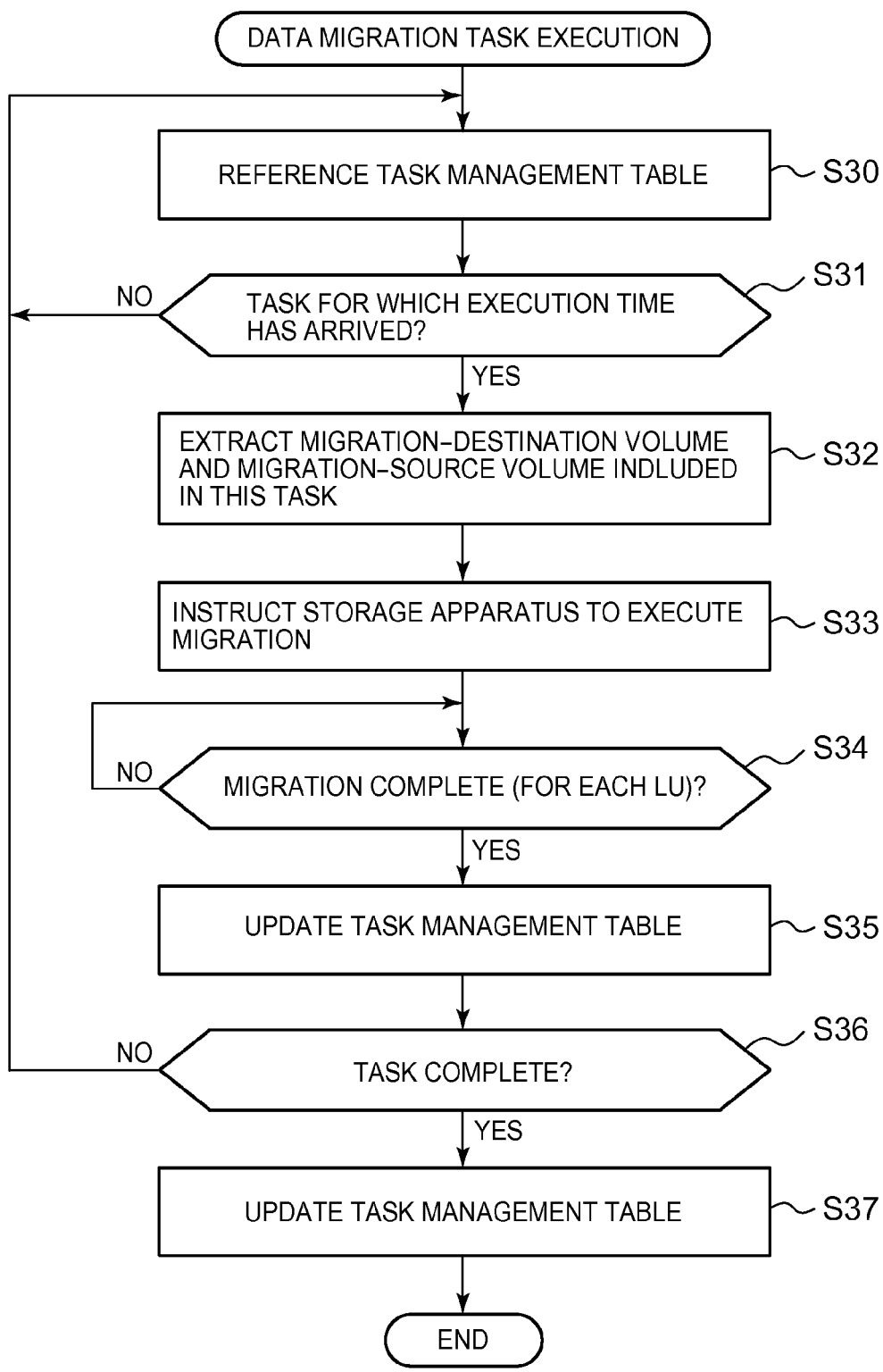
FIG. 12 is a flowchart of a process for executing a data migration task.

FIG. 12 is a flowchart showing the process for executing a data migration task. The process shown in FIG. 12 corresponds to S12 of FIG. 10. The management server 10 references the task management table T10 (S30), and determines whether or not a task exists for which the execution timing (scheduled start date/time) has arrived (S31).

In a case where a task for which the execution timing has arrived is discovered (S31: YES), the management server 10 respectively extracts the identifier specifying the migration-source volume and the identifier specifying the migration-destination volume included in this task (S32).

The management server 10, based on the extracted information, instructs the migration-source storage apparatus and/or the migration-destination storage apparatus to execute the data migration (S33). A plurality of data migrations may be included in a single task. This is due to the need to migrate in unison a plurality of logical volumes managed by a single migration group.

Therefore, a data migration is started for each volume pair. A volume pair may also be called a copy pair. The data migrations between the respective volume pairs may be processed parallelly. Or, the configuration may be such that after the data migration of one volume pair has been completed, the data migration of the next volume pair is started.

When one data migration is complete, a report is made to the management server 10 from at least one of either the migration-source storage apparatus or the migration-destination storage apparatus to the effect that the data migration process has been completed (S34). Data migration is carried out for each volume pair. Therefore, the storage apparatus reports to the management server 10 to the effect that data migration has been completed for each volume pair.

The management server 10, upon receiving the report from the storage apparatus, updates the task management table T10 (in particular, table T12) (S35), and determines whether or not all the data migrations within the task have been completed (S36).

In a case where an unfinished data migration remains within this task (S36: NO), the management server 10 returns to S30 and waits for a complete-report from the storage apparatus. Further, when the execution timing of another task arrives, the management server 10 instructs the storage apparatus to execute this other task. That is, the management server 10 is able to process a plurality of migration tasks in parallel.

When all the data migrations within a single task have ended (S36: YES), the management server 10 updates the task management table T10 (in particular, table T11) (S37), and ends this process. Furthermore, error termination is also determined to be the end of a data migration.

Figure 13:
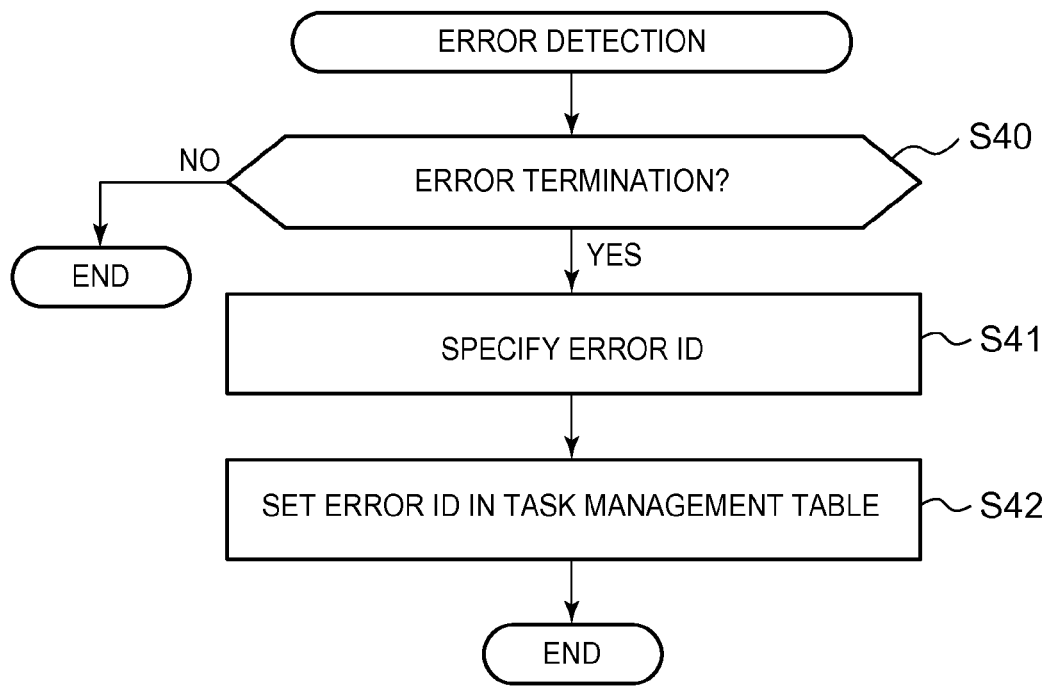
FIG. 13 is a flowchart of a process for detecting an error occurring in a data migration.

FIG. 13 is a flowchart showing a process for detecting an error. This process corresponds to S13 of FIG. 10. The management server 10 determines whether or not the data migration ended in error based on the notification from the storage apparatus 20 (S40). In a case where the determination is that the data migration ended in an error (S40: YES), the management server 10 references the error information table T20, specifies the error ID (S41), and stores the error ID in the task management table T10 (table T12 in particular) (S42).

Figure 14:
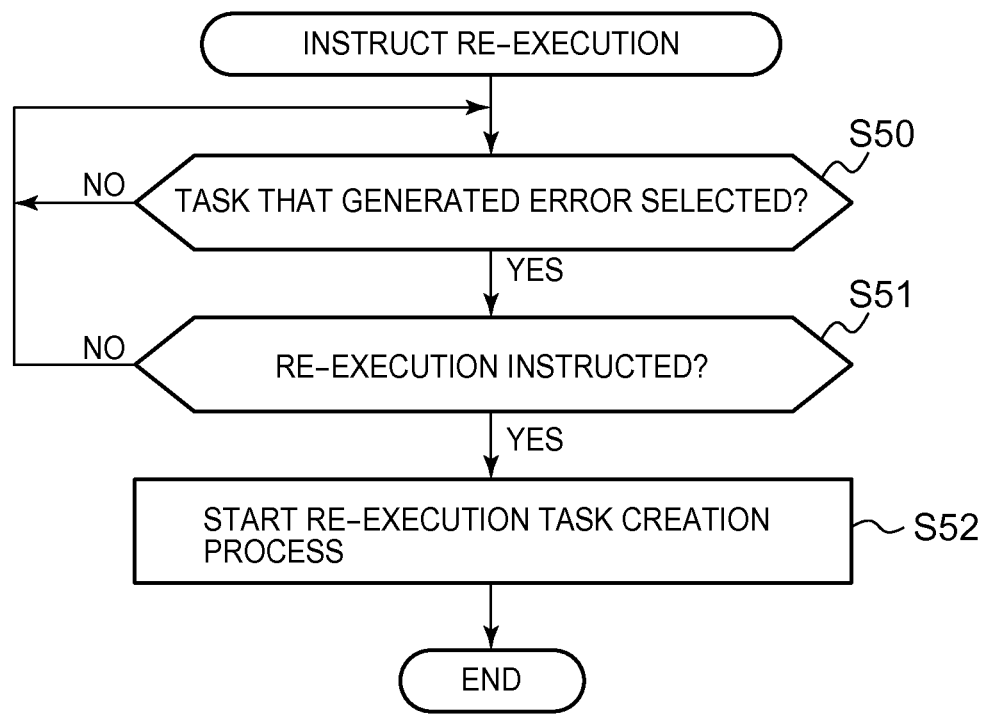
FIG. 14 is a flowchart of a process for instructing a re-execution of a data migration.

FIG. 14 is a flowchart showing the process for instructing the management server 10 to re-execute a failed migration task. This process corresponds to S14 of FIG. 10. This process will be explained here by referring to the screen of FIG. 15.

FIG. 15 shows a task management screen G10 provided by the management server 10. The task management screen G10 is created based on the task management table T10. The user is able to display the task management screen G10 whenever necessary to check the execution status of the respective tasks.

The task management screen G10, for example, comprises a check column G100, a task ID column G101, a task type column G102, a task status column G103, a progress column G104, a start date/time column G105, an end date/time column 6106, an estimated time column G107, an execute button G108, a cancel button G109, a pause button G110, and a re-execute button G111.

The check column G100 is used to select a task. The Task ID column G101 displays the ID of each task. The task type column G102 displays the type of each task. Since a data migration is being described, in this embodiment the task type is "migration". Furthermore, another task type, for example, may be a shredder task that carries out a shredder task for destroying data.

The task status column G103 displays the status of a task. Task statuses, for example, may include "complete", "error", "executing" and "pre-execution". The progress column G104 displays the state of progress of a task in the form of a percentage. The start date/time column G105 displays either the date/time at which a task started, or the date/time at which the start was scheduled. The end date/time column G106 displays the date/time of either the normal-end or error-termination of a task. The estimated time column G107 displays the estimated time required to complete a task.

The execute button G108 is for executing a selected task. The cancel button G109 is for cancelling a selected task. The pause button G110 is for temporarily suspending the execution of a selected task. The re-execute button G111 is for creating a re-execution task for a selected task.

Return to FIG. 14. The management server 10 determines whether or not a task that ended in an error has been selected by the user in the task management screen G10 (S50). Then, the management server 10 determines whether or not the re-execute button G111 has been operated for the error-terminated task (S51). In a case where the re-execute button G111 has been operated (S51: YES), the management server 10 boots up the process for creating the re-execution task (S52).

Figure 16:
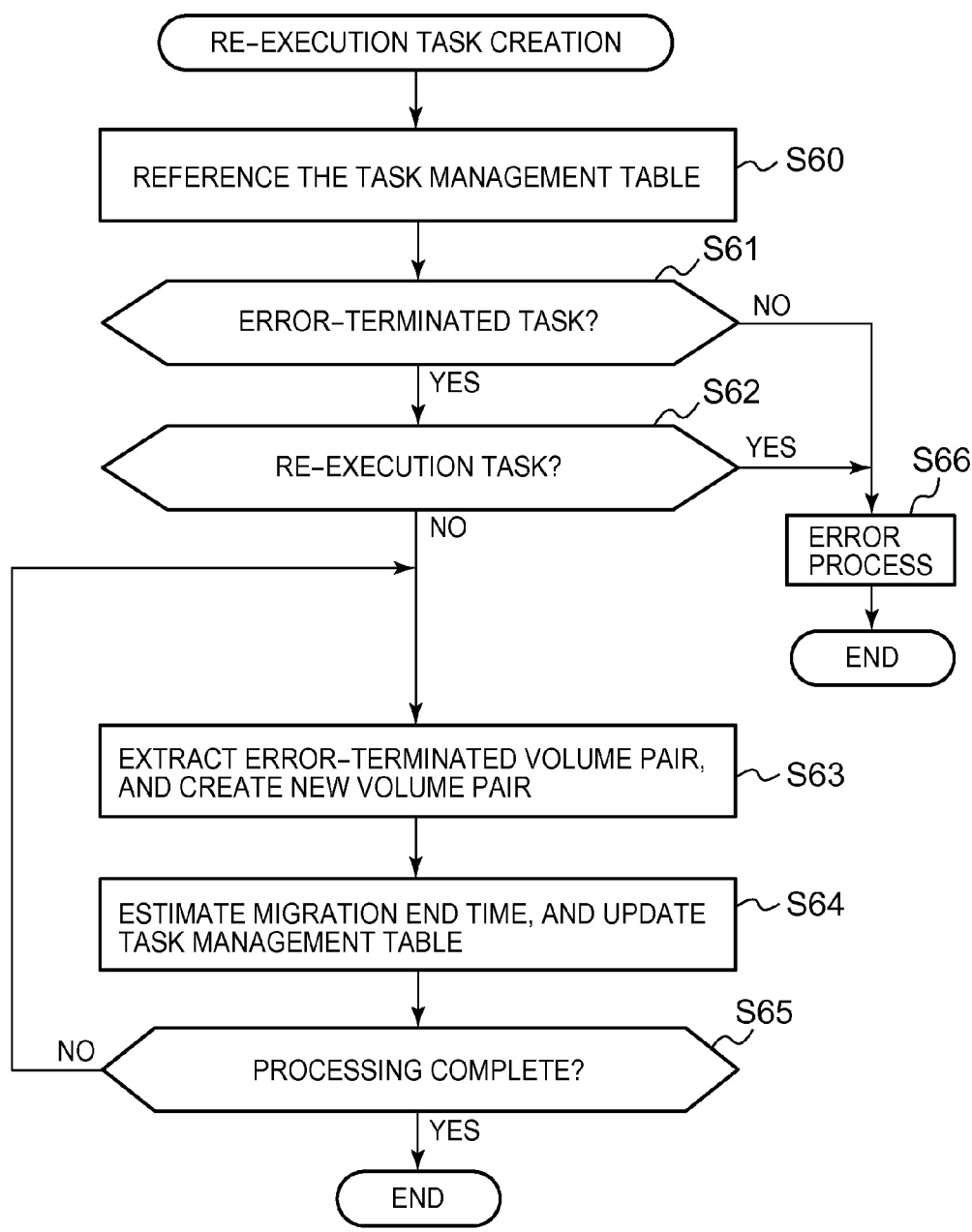
FIG. 16 is a flowchart of a process for creating a re-execution task.

FIG. 16 is a flowchart showing the process for creating a re-execution task. The management server 10 references the task management table T10 (S60), and determines whether or not there is a task that ended in an error (S61). When an error-terminated task exists (S61: YES), the management server 10 determines whether or not this error-terminated task is a re-execute task (S62). That is, a determination is made as to whether or not it is a task that has failed two times in a row (S62).

In a case where either not one error-terminated task exists (S61: NO), or the error-terminated task is a re-execution task (S62: YES), an error process is carried out (S66). The management server 10, for example, notifies the user of an error message such as "no re-executable tasks".

In a case where a task other than a re-execution task ended in an error (S61: YES and S62: NO), the management server 10 extracts the volume pair of the error-terminated data migration from the error-terminated task, and creates a volume pair for executing the data migration once again (S63). A detailed explanation will be given further below, but in a case where the volume pair of the error-terminated data migration is able to be used as-is, this volume pair is used as-is to create a data migration for re-execution. In a case where the volume pair of the error-terminated data migration is unable to be used as-is, for example, a different migration-destination volume is selected and a new volume pair is created.

The management server 10 estimates the data migration completion time for the re-execution, and stores the contents set in S63 and the estimated completion time in the task management table T10 (S64). S63 and S64 are repeatedly executed until preparations for the re-execution of the error-terminated data migration within the error-terminated task are complete (S65).

Figure 17:
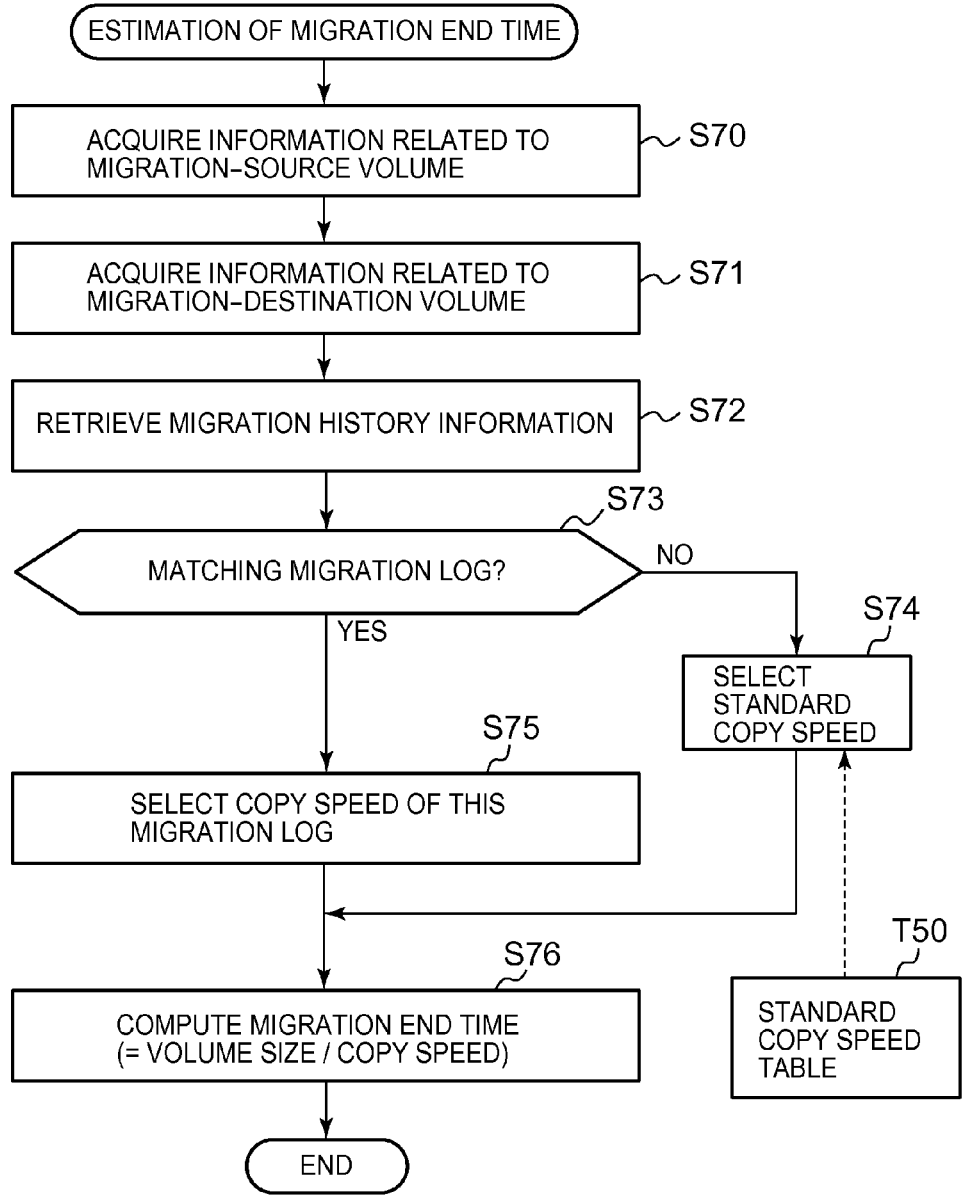
FIG. 17 is a flowchart of a process for estimating a data migration end time.

FIG. 17 is a flowchart of the process for estimating the migration completion time (migration end time). This process is used in S23 of FIG. 11 and S64 of FIG. 16.

The management server 10 respectively acquires information related to the migration-source volume and information related to the migration-destination volume form the volume information table T30 (S70, S71). The volume-related information, for example, may include the RAID level (including the RAID configuration), the disk type, the revolutions, the size, and the apparatus ID.

The management server 10 retrieves the migration history information T40 based on the information acquired in S70 and S71 (S72), and determines whether or not there is a data migration history with a matching volume pair configuration (S73). That is, the management server 10 searches the history of data migrations carried out in the past for a volume pair that has the same configuration as the volume pair for which an estimation of the data migration completion time is to be made.

In a case where a data migration having the same configuration as the estimation-targeted volume pair has not been carried out in the past (S73: NO), the management server 10 references the table T50 for managing the standard copy speed, and selects a prepared standard copy speed (S74).

The standard copy speed, for example, may be stipulated based on the average value of the measured speed of a data migration carried out in the past. A plurality of standard copy speeds, for example, may be prepared in accordance with the conditions, such as by RAID level, disk type or revolutions. In accordance with this, the management server 10 may also use a plurality of standard copy speeds in accordance with the respective conditions to compute a copy speed for use in making an estimate.

In a case where a data migration having the same configuration has been carried out in the past (S73: YES), the management server 10 selects the copy speed at the time of the past data migration (S75). The management server 10 estimates the time required to complete the data migration based on the copy speed selected in either S74 or S75 (S76). Simply stated, the management server 10 is able to estimate the completion time by dividing the data migration size by the copy speed (estimated completion time=size of data migration/copy speed).

Furthermore, when estimating the completion time for a re-execution task, the latest migration history information T40 is used. That is, the management server 10 estimates the completion time of the re-execution task using the latest migration history information T40 (new) rather than the migration history information T40 (old) used to estimate the completion time for the failed original task. Consequently, it is possible to enhance estimation accuracy.

Furthermore, the re-execution task completion time is estimated based on the completion times for the respective data migrations included in the re-execution task, and the completion time for the successful data migration in the original failed task is not taken into account.

For example, it is supposed that the initial task is the first task, and that a first pair comprising volume #10 and volume #20, a second pair comprising volume #11 and volume #21, and a third pair comprising volume #12 and volume #22 are included within the first task.

It is supposed that the result of executing the first task was that only the data migration of the first pair of volume #10 and volume #20 was successful, and the data migrations of the second pair (the pair of volume #11 and volume #21) and the third pair (the pair of volume #12 and volume #22) failed.

Accordingly, a second task is created as a re-execution task. The second task comprises the second pair and the third pair. The management server 10 respectively estimates the completion time of the second pair data migration and the completion time of the third pair data migration based on the latest migration history information T40 (new) updated subsequent to the end of the first task. In addition, the management server 10 estimated the completion time of the second task based on the second pair completion time and the third pair completion time.

Figure 18:
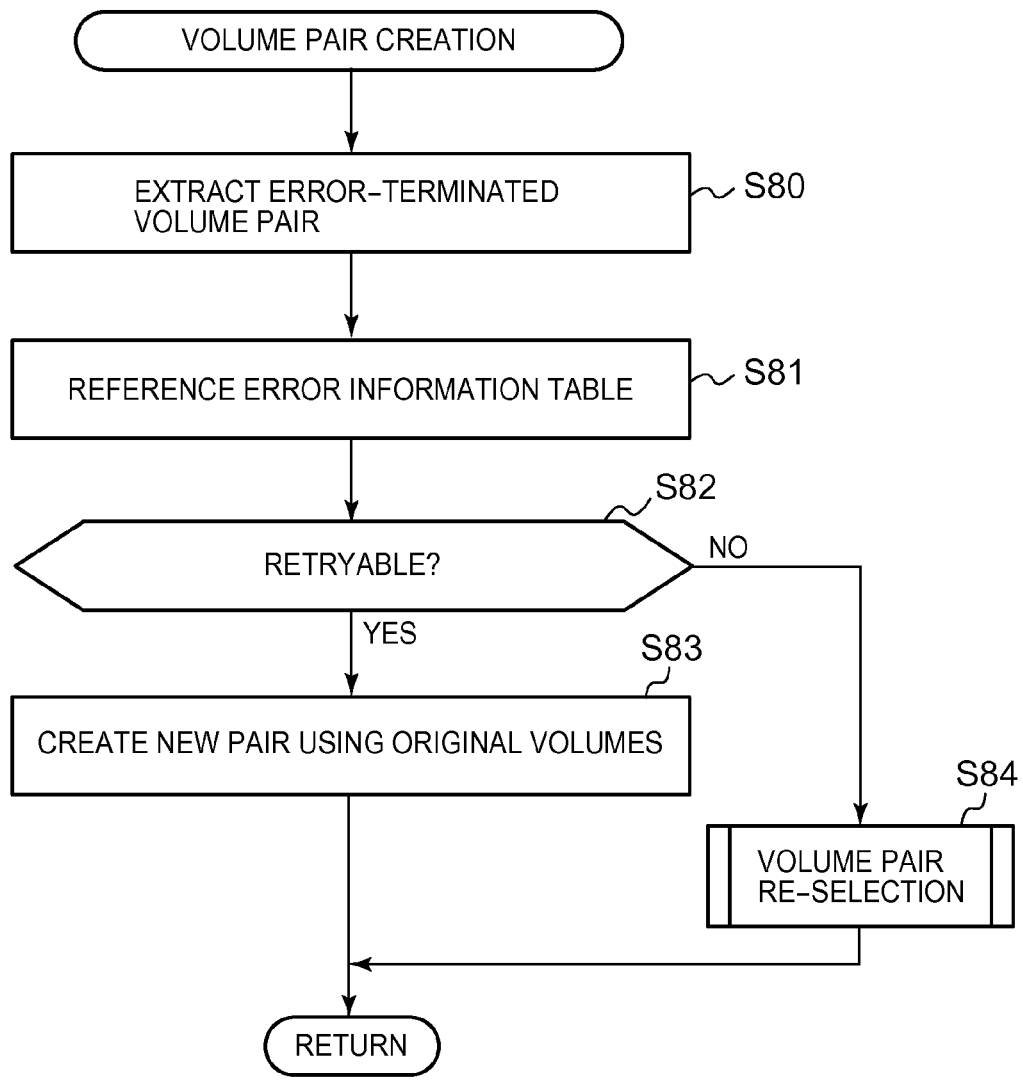
FIG. 18 is a flowchart of a process for creating a volume pair for a data migration.

FIG. 18 is a flowchart showing the process for creating a volume pair for re-executing a data migration. This process corresponds to S63 of FIG. 16.

The management server 10 extracts the volume pair for the error-terminated data migration (S80), and references the error information table T20 to confirm the error related to this volume pair (S81).

The management server 10 determines whether or not the error that occurred with respect to the volume pair is a retryable error (S82). In the case of a retryable error (S82: YES), the management server 10 re-selects the original migration-source volume and migration-destination volume and creates a volume pair (S83). That is, in the case of a retryable error, the volume pair configuration does not change.

By contrast, in a case where the error that occurred in the volume pair is not a retryable error (S82: NO), the management server 10, as will be described below, changes and re-selects the volume pair configuration (S84).

Figure 19:
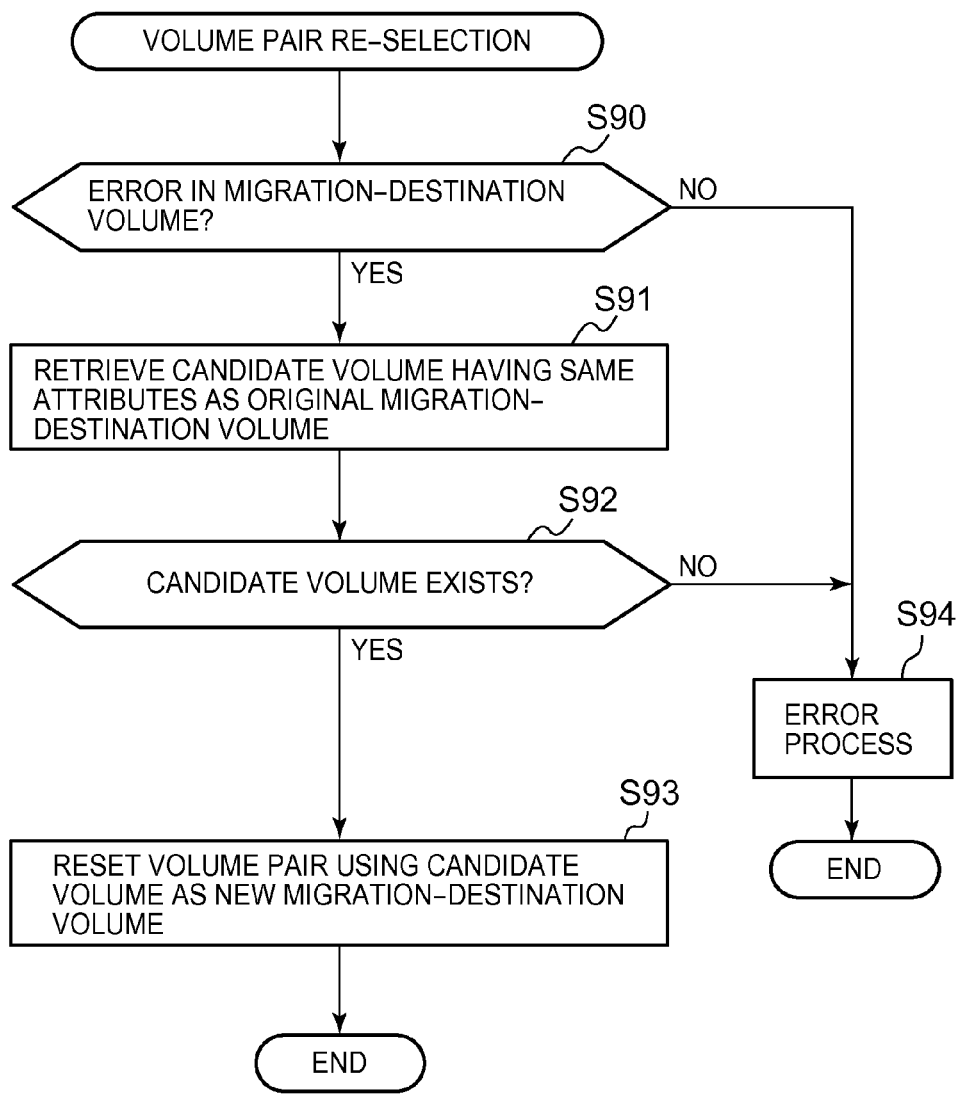
FIG. 19 is a flowchart of a process for re-selecting a migration-destination volume of the volume pair.

FIG. 19 is a flowchart showing the process for re-selecting the volume pair. This process corresponds to S84 of FIG. 18. The management server 10 determines whether or not the error determined to be a non-retryable error is an error related to the migration-destination volume (S90).

In a case where the error is related to the migration-destination volume (S90: YES), the management server 10 retrieves, from among the plurality of logical volumes of the migration-destination storage apparatus, a different logical volume having the same attributes as the original migration-destination volume (S91). For example, in a case where the initially selected migration-destination volume comprises attributes such as "RAID5 (3D+1P), SATA disk, 7200 rpm", the management server 10 retrieves a different logical volume having the same attributes as the original attributes.

When a logical volume, which has the same attributes as the initially selected migration-destination volume, and which is capable of becoming a candidate (may be called the candidate volume), is detected (S92: YES), the management server 10 selects the detected candidate volume as the new migration-destination volume, and resets the volume pair (S93).

In a case where either the error was in the migration-source volume (S90: NO), or a candidate volume is not found (S92: NO), the error process is carried out (S94). The management server 10, for example, notifies the user of an error message such as "Unable to select volume pair for re-execution of data migration".

Configuring this embodiment like this achieves the following effects. In this embodiment, when a task comprising a plurality of data migrations has failed, the user is able to instruct the creation of a re-execution task using the management screen G10 as shown in FIG. 15. Consequently, it is possible to create a re-execution task using the information of the failed task, enhancing usability.

In this embodiment, management is carried out by associating the failed original task with the re-execution task as shown in the management table T11 of FIG. 5. Therefore, it is possible to readily confirm the final result of a data migration, enhancing usability.

In this embodiment, a new task ID is assigned to the re-execution task and made correspondent to the original task ID. Consequently, it is possible to uniformly manage in accordance with the task management table T10 the logs of the respective data migrations carried out inside the information processing system. That is, in this embodiment, the migration history information T40 may be omitted. However, for convenience sake, this embodiment was explained by giving a configuration that utilizes migration history information T40 as an example.

In this embodiment, in the case of a retryable error, the volume pair of the failed data migration is re-selected, and in the case of a non-retryable error, a different logical volume having the same attributes as the original migration-destination volume is selected anew and a data migration is set. Therefore, it is possible to increase the possibility of the re-execution task ending normally.

In this embodiment, the time required to complete a data migration is estimated, and the result of this estimation is provided to the user (Refer to FIG. 15). Therefore, the user is able to know beforehand about how long the data migration will take, enhancing usability. For example, the user is able to instruct or transpose the execution order of a plurality of tasks such that the migration task having the longest completion time is started first.

Second Embodiment

A second embodiment will be explained based on FIG. 20. The following embodiments, to include this embodiment, are equivalent to variations of the first embodiment. Therefore, in the embodiments that follow, the explanations will focus on the differences with the first embodiment. In the second embodiment, when a candidate volume is retrieved, a logical volume, whose important attributes match those of the initially selected migration-destination volume, is retrieved.

Figure 20:
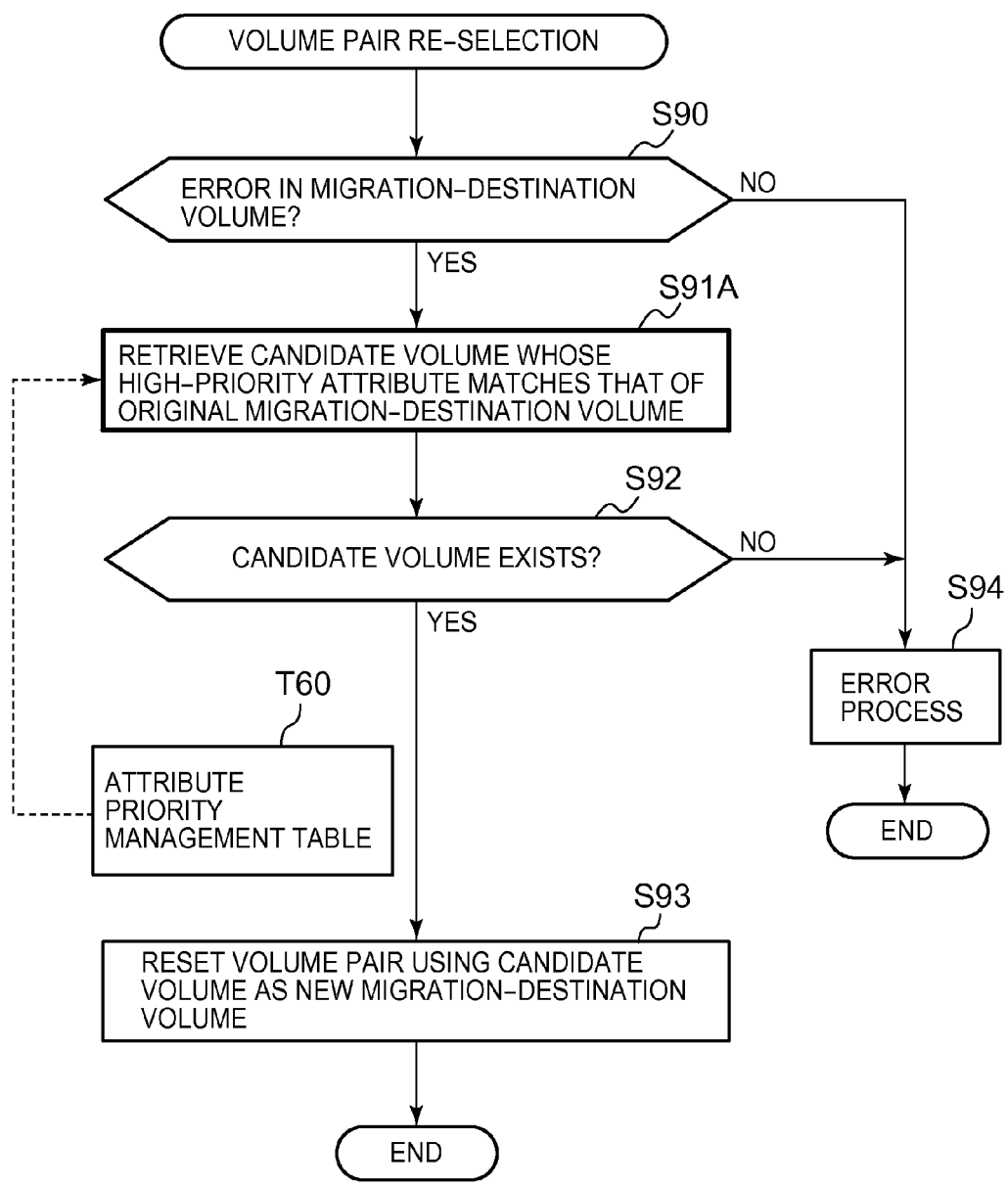
FIG. 20 is a flowchart of a process, which re-selects a volume pair, executed by a system related to a second embodiment.

FIG. 20 is a flowchart showing a volume pair re-selection process that is implemented by the management server 10 according to this embodiment. This process comprises S90 and S92 through S94 in common with the process shown in FIG. 19; only S91A differs.

In the case of a migration-destination volume error (S90: YES), the management server 10 references a table T60 for managing attributes in order of priority, and retrieves a candidate volume whose highest priority attribute matches the highest priority attribute set beforehand (S91A).

The priority of each attribute, such as the RAID level, the disk type, the revolutions, and the array group ID, is set beforehand in the attribute priority management table T60.

Attributes for which the order of priority is set relatively high, for example, may include the RAID level and the disk type. Attributes for which the order of priority is set relatively low, for example, may include the array group ID and revolutions.

The management server 10 selects as the candidate volume, from among the plurality of logical volumes capable of being selected as the migration-destination volume, the logical volume whose high priority attribute matches that of the initially selected migration-destination volume.

Configuring this embodiment like this achieves the same effects as those of the first embodiment. Furthermore, in this embodiment, the logical volume whose high priority attribute matches that of the initially selected migration-destination volume is retrieved as the candidate volume that will replace the initially selected migration-destination volume. Therefore, it is possible to broaden the range of the volumes capable of being selected as the candidate volume, enhancing usability.

Third Embodiment

Figure 21:
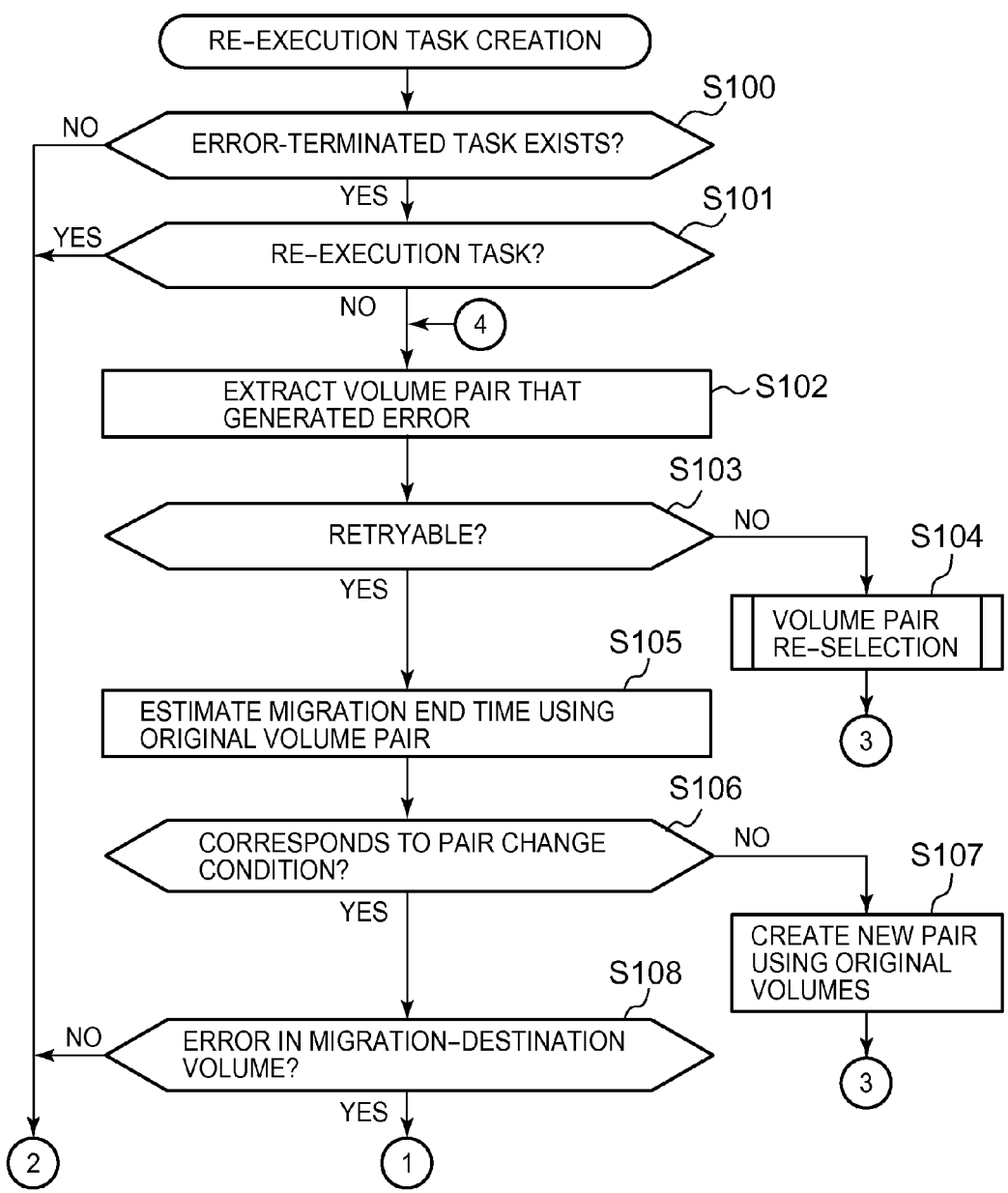
FIG. 21 is a flowchart of a process, which creates a re-execution task, executed by a system related to a third embodiment.
Figure 22:
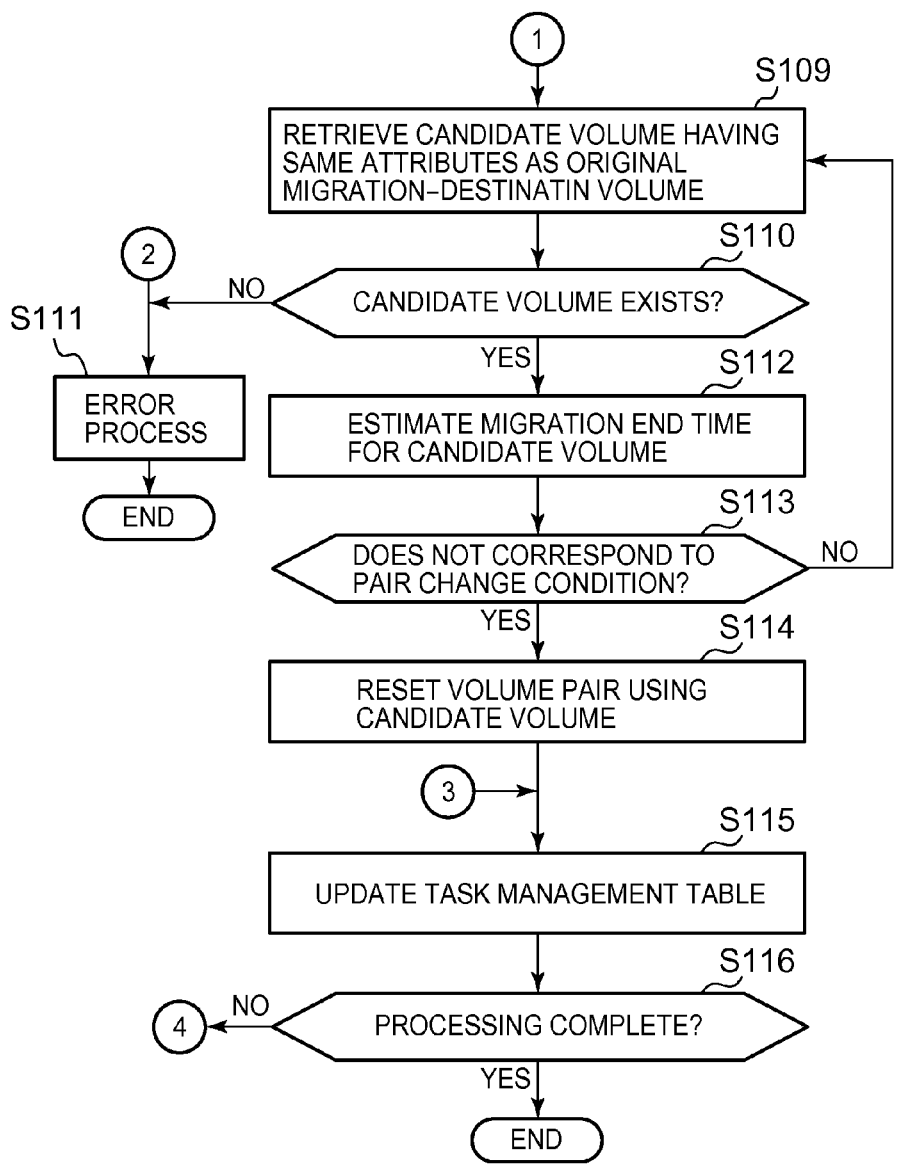
FIG. 22 is a continuation of the flowchart of FIG. 21.

A third embodiment will be explained based on FIGS. 21 and 22. In this embodiment, in a case where a retryable error has occurred in a data migration, the volume pair configuration is changed based on an estimation result for the data migration completion time. FIG. 21 is a flowchart showing the re-execution task creation process implemented by the management server 10 of this embodiment.

The management server 10 determines whether or not there is a task that ended in an error (S100). When an error-terminated task exists (S100: YES), the management server 10 determines whether or not this error-terminated task is a re-execution task (S101).

In a case where either no error-terminated task exists (S100: NO) or the error-terminated task is a re-execution task (S101: YES), the management server 10 proceeds to the error process shown in FIG. 22 (S111). In the error process, for example, a prepared error message is notified to the user.

Return to FIG. 21. In a case where the error-terminated task is not a re-execution task (S101: NO), the management server 10 extracts the volume pair for which data migration failed within this error-terminated task (S102).

The management server 10 determines whether or not the cause of this data migration error is retryable (S103). If it is not a retryable error (S103: NO), the management server 10 executes the process explained using either FIG. 19 or FIG. 20 (S104).

If it is a retryable error (S103: YES), the management server 10 re-estimates the time required to complete the data migration for the initially selected volume pair (S105).

In the first embodiment, in the case of a retryable error, the data migration is executed once again using the initially selected volume pair (the original volume pair). By contrast, in this embodiment, the completion time is re-estimated, and the volume pair configuration is changed in accordance with the result thereof. Accordingly, in this embodiment, the data migration completion time for the initial volume pair is re-estimated (S105).

The management server 10 determines whether or not the volume pair corresponds to the configuration change condition on the basis of the estimated completion time. The conditions for changing the configuration of the volume pair, for example, are defined beforehand as described below.

(Condition 1) When the completion time $T_{new}$ estimated this time is $\alpha$-times or greater than the completion time $T_{old}$ estimated previously ($T_{new} \geq T_{old} \times \alpha$, where $\alpha > 0$). For example, the value of $\alpha$ may be set at around "1.2". The value of α is an example, and the scope of the present invention is not limited to this value. The same holds true for β and γ described hereinbelow.

(Condition 2) When the error-termination time $T_{error}$ of the original task is β-times or greater than the completion time $T_{new}$ estimated this time ($T_{error} \geq T_{new} \times \beta$, where β>0). For example, the value of β may be set at around "2".

(Condition 3) When there is a volume that has a completion time $T_{vol2}$ of γ-times or greater than the completion time $T_{vol1}$ of another volume pair ($T_{vol2} \geq T_{vol1} \times \gamma$, where γ>0). For example, the value of γ may be set at around "1.5".

The above-mentioned conditions 1 through 3 are examples, and the scope of the present invention is not limited thereto. A determination may also be made as to whether or not a volume pair configuration should be changed based on another condition.

In a case where the volume pair does not correspond to a configuration change condition (S106: NO), the management server 10 sets the original volume pair as the new volume pair (S107), and proceeds to S115 of FIG. 22.

In a case where the volume pair corresponds to a configuration change condition (S106: YES), the management server 10 determines whether or not it was a migration-destination volume error (S108). In a case where the error is not in the migration-destination volume (S108: NO), the error process is carried out, and a prescribed error message is notified to the user (S111).

In a case where the error is in the migration-destination volume (S108: YES), the management server 10 proceeds to S109 of FIG. 22. Refer to FIG. 22. The management server 10 retrieves a candidate volume having the same attributes as the original migration-destination volume inside the migration-destination storage apparatus (S109). As was explained in the second embodiment, the configuration may be such that the highest priority attribute of the candidate volume matches that set in the original migration-destination volume.

The management server 10 determines whether or not a candidate volume was found (S110). In a case where not one candidate volume could be found (S110: NO), the error process is carried out, and a prescribed error message is notified to the user (S111).

In a case where a candidate volume was found (S110: YES), the management server 10 estimates the data migration completion time for the candidate volume (S112). The management server 10 determines whether the completion time estimated for the candidate volume fails to correspond to the condition for changing the volume pair configuration described hereinabove (S113). In a case where, if selected, this candidate volume will correspond to the volume pair configuration change condition (S113: NO), the management server 10 returns to S109 and retrieves a different candidate volume.

In a case where the candidate volume does not correspond to the volume pair configuration change condition (S113: YES), the management server 10 resets the volume pair using this candidate volume (S114), and registers the re-execution task in the task management table T10 (S115).

The management server 10 determines whether or not a re-execution task has been created for each error-terminated task for which the creation of a re-execution task was instructed (S116). In a case where there remains an error-terminated task for which a re-execution task has not been created (S116: NO), the management server 10 returns to S102. When re-execution tasks have been created for all the instructed error-terminated tasks (S116: YES), this process ends.

Configuring this embodiment like this also achieves the same effects as the first embodiment and the second embodiment. In addition, in this embodiment, a determination is made as to whether or not it is better to change the configuration of the volume pair based on the data migration completion time even in a case where the original volume pair is able to be re-selected as-is. Therefore, it is possible to further increase the possibility that the re-execution task will be successful, enabling the enhancement of user usability and system reliability.

Fourth Embodiment

A fourth embodiment will be explained based on FIG. 23. In this embodiment, the determination as to whether or not the volume pair corresponds to the configuration change condition described in the third embodiment is made when creating a data migration task.

Figure 23:
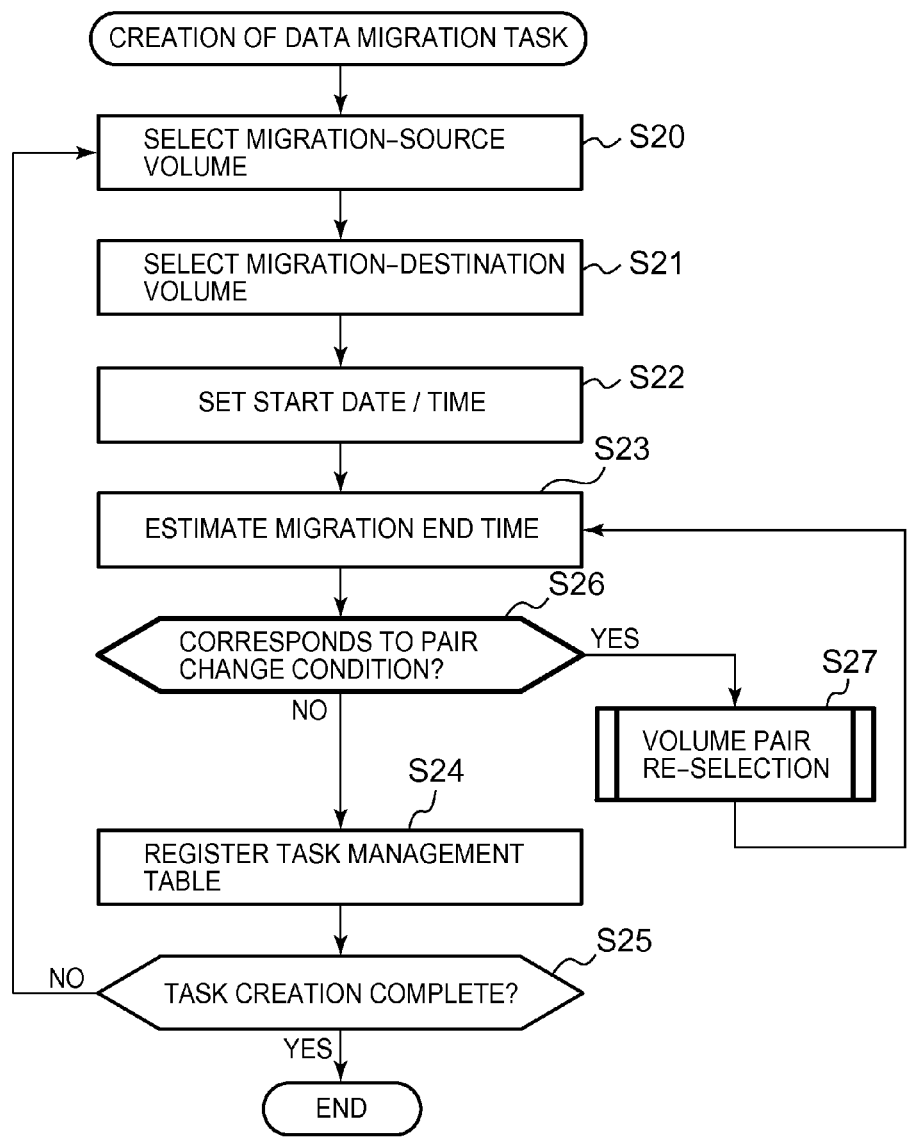
FIG. 23 is a flowchart of a process, which creates a data migration task, executed by a system related to a fourth embodiment.

FIG. 23 is a flowchart of the process for creating a data migration task executed by the management server 10 in accordance with this embodiment. This process comprises all of S20 through S25 shown in FIG. 11. Furthermore, in this process, the new steps S26 and S27 are added between S23 and S24.

The management server 10, subsequent to estimating the data migration completion time for the created volume pair (S23), makes a determination as to whether or not this estimated time corresponds to the volume pair configuration change condition (S26).

In a case where the estimated time does correspond to the volume pair configuration change condition (S26: YES), the management server 10 changes the configuration of the volume pair by carrying out the process shown in either FIG. 19 or FIG. 20 (S27).

Configuring this embodiment like this also achieves the same effects as the first through the third embodiments. Furthermore, in this embodiment, the determination as to whether or not the configuration of the volume pair is appropriate based on the estimation value of the data migration completion time is made beforehand at the point in time that the task is created. Therefore, it is possible to increase the possibility that the data migration task will be successful, enhancing usability and reliability.

Furthermore, the present invention is not limited to the respective embodiments described hereinabove. A person having ordinary skill in the art should be able to make various additions and changes without departing from the scope of the present invention. For example, it is also possible to arbitrarily combine the respective embodiments described above. For example, with the exception of the configuration for estimating the migration completion time, it is possible to combine the above-mentioned embodiments with respect to migration task re-creation and related aspects. By contrast, with the exception of the configuration for re-creating the migration task, it is also possible to combine the above-mentioned embodiments with respect to the estimated migration completion time and related aspects. These combinations are also included within the scope of the present invention.

In the above-mentioned embodiments, cases that omit the preservation of data in the migration-destination volume were explained. However, a method for carrying out a data migration while preserving the data of the migration-destination volume by transposing the data of the migration-destination volume and the data of the migration-source volume is known. In the case of the transposition method, for example, a save volume for temporary use is prepared, data is migrated from the migration-destination volume to the save volume, then data is migrated from the migration-source volume to the migration-destination volume, and finally the data is migrated from the save volume to the migration-source volume. The transposition method may also be realized via a method other than the three steps mentioned above.

Furthermore, in a case that omits the preservation of the data of the migration-destination volume as described in the above-mentioned embodiments, there is the possibility of another user, who differs from the user that created the migration task, migrating different data to the migration-destination volume beforehand. In this case, the data migration to this migration-destination volume may be inhibited to prevent the data that had been moved to the migration-destination volume from being overwritten.

This inhibiting process may be carried out by either the storage apparatus side or the management server side. This inhibiting process, for example, may be realized by making it possible to respectively set information as to whether this migration-destination volume is able to be set as the migration destination in each volume. If settability information like this is prepared, it is possible to prevent data from being copied from various different migration-source volumes to the same migration-destination volume.

What is claimed is:

1. An apparatus for performing data migration of an information processing device having a plurality of storage areas, comprising:
    a memory configured to store a migration plan including a storage area of a migration source and a storage area of a migration destination as a task in a task management table; and
    a microprocessor configured to execute the migration plan, wherein the microprocessor is configured to:
    obtain information related to a storage area of a migration source and a storage area of a migration destination;
    obtain a copy speed from migration history information when there is migration history information which shows migration history from a same or similar storage area with the storage area of the migration source to the same or similar storage area with the storage area of the migration destination, and calculate a data migration time required for data migration by dividing a size of data which is migrated from the storage area of the migration source to the storage area of the migration destination at the copy speed; and
    indicate the calculated data migration time associated with an identifier of the task.

2. The apparatus according to claim 1, further comprising:
    calculate a data migration time by dividing the size of data which is migrated from the storage area of the migration source to the storage area of the migration destination at a predetermined copy speed when there is no migration history information.

3. The apparatus according to claim 2, wherein the microprocessor is configured to obtain information as to a storage area of the migration source and a storage area of the migration destination with respect to a migration task for which task execution has failed.

4. The apparatus according to claim 3, wherein the microprocessor is further configured to:
    recalculate a data migration time when the migration task for which task execution has failed;
    perform a data volume pair configuration change when the recalculated data migration time is at least $\alpha$ times greater than a previously calculated data migration time, wherein $\alpha$ is a real number.

5. The apparatus according to claim 3, wherein the microprocessor is further configured to:
    recalculate a data migration time when the migration task for which task execution has failed;
    perform a data volume pair configuration change when an error termination time of a most recently performed data migration is at least $\beta$ times greater than the recalculated data migration time, wherein $\beta$ is a real number.

6. The apparatus according to claim 2, wherein the microprocessor is further configured to:
    perform a data volume pair configuration change when a data migration completion time of a data volume for which data migration has been performed is at least $\gamma$ times greater than a data migration completion time of another data volume for which data migration has been performed, wherein $\gamma$ is a real number.

7. A method of performing data migration of an information processing device having a plurality of storage areas, comprising:
    storing, in a memory, a migration plan including a storage area of a migration source and a storage area of a migration destination as a task in a task management table; and
    executing, by a microprocessor, the migration plan, wherein the executing comprises:
    obtaining information related to a storage area of a migration source and a storage area of a migration destination;
    obtaining a copy speed from migration history information when there is migration history information which shows migration history from a same or similar storage area with the storage area of the migration source to the same or similar storage area with the storage area of the migration destination, and calculating a data migration time required for data migration by dividing a size of data which is migrated from the storage area of the migration source to the storage area of the migration destination at the copy speed; and
    indicating the calculated data migration time associated with an identifier of the task.

8. The method according to claim 7, wherein the executing further comprises:
    calculating a data migration time by dividing the size of data which is migrated from the storage area of the migration source to the storage area of the migration destination at a predetermined copy speed when there is no migration history information.

9. The method according to claim 8, wherein the executing further comprises:
    obtaining information as to a storage area of the migration source and a storage area of the migration destination with respect to a migration task for which task execution has failed.

10. The method according to claim 8, wherein the executing further comprises:
    recalculating a data migration time when the migration task for which task execution has failed;
    performing a data volume pair configuration change when the recalculated data migration time is at least $\alpha$ times greater than a previously calculated data migration time, wherein $\alpha$ is a real number.

11. The method according to claim 8, wherein the executing further comprises:
    recalculating a data migration time when the migration task for which task execution has failed;
    performing a data volume pair configuration change when an error termination time of a most recently performed data migration is at least $\beta$ times greater than the recalculated data migration time, wherein $\beta$ is a real number.

12. The method according to claim 7, wherein the executing further comprises:
performing a data volume pair configuration change when a data migration completion time of a data volume for which data migration has been performed is at least $\gamma$ times greater than a data migration completion time of another data volume for which data migration has been performed, wherein $\gamma$ is a real number.

13. A non-transitory computer readable medium storing computer program product, which, when executed by a computer, performs data migration of an information processing device having a plurality of storage areas, the data migration comprising:
storing a migration plan including a storage area of a migration source and a storage area of a migration destination as a task in a task management table; and
obtaining information related to a storage area of a migration source and a storage area of a migration destination;
obtaining a copy speed from migration history information when there is migration history information which shows migration history from a same or similar storage area with the storage area of the migration source to the same or similar storage area with the storage area of the migration destination, and calculating a data migration time required for data migration by dividing a size of data which is migrated from the storage area of the migration source to the storage area of the migration destination at the copy speed; and
indicating the calculated data migration time associated with an identifier of the task.

14. The non-transitory computer readable medium according to claim 13, wherein the data migration further comprises:
calculating a data migration time by dividing the size of data which is migrated from the storage area of the migration source to the storage area of the migration destination at a predetermined copy speed when there is no migration history information.

15. The non-transitory computer readable medium according to claim 14, wherein the data migration further comprises:
obtaining information as to a storage area of the migration source and a storage area of the migration destination with respect to a migration task for which task execution has failed.

16. The non-transitory computer readable medium according to claim 14, wherein the data migration further comprises:
recalculating a data migration time when the migration task for which task execution has failed;
performing a data volume pair configuration change when the recalculated data migration time is at least $\alpha$ times greater than a previously calculated data migration time, wherein $\alpha$ is a real number.

17. The non-transitory computer readable medium according to claim 14, wherein the data migration further comprises:
recalculating a data migration time when the migration task for which task execution has failed;
performing a data volume pair configuration change when an error termination time of a most recently performed data migration is at least $\beta$ times greater than the recalculated data migration time, wherein $\beta$ is a real number.

18. The non-transitory computer readable medium according to claim 13, wherein the data migration further comprises:
performing a data volume pair configuration change when a data migration completion time of a data volume for which data migration has been performed is at least $\gamma$ times greater than a data migration completion time of another data volume for which data migration has been performed, wherein $\gamma$ is a real number.

* * * * *